(12) United States Patent
Akashi et al.

(10) Patent No.: US 12,461,122 B2
(45) Date of Patent: Nov. 4, 2025

(54) MULTI-AXIS INERTIAL FORCE SENSOR

(71) Applicant: DENSO CORPORATION, Kariya (JP)

(72) Inventors: Teruhisa Akashi, Kariya (JP); Shota Harada, Kariya (JP); Yoshiyuki Hata, Kariya (JP)

(73) Assignee: DENSO CORPORATION, Kariya (JP)

( * ) Notice: Subject to any disclaimer, the term of this patent is extended or adjusted under 35 U.S.C. 154(b) by 284 days.

(21) Appl. No.: 18/297,929

(22) Filed: Apr. 10, 2023

(65) Prior Publication Data

US 2023/0243866 A1 Aug. 3, 2023

Related U.S. Application Data

(63) Continuation of application No. PCT/JP2021/037996, filed on Oct. 14, 2021.

(30) Foreign Application Priority Data

Nov. 6, 2020 (JP) ................................. 2020-185625

(51) Int. Cl.
*G01P 15/18* (2013.01)
*G01C 19/00* (2013.01)
*G01C 19/5783* (2012.01)
*G01P 1/02* (2006.01)

(52) U.S. Cl.
CPC .............. *G01P 15/18* (2013.01); *G01C 19/00* (2013.01); *G01C 19/5783* (2013.01); *G01P 1/023* (2013.01)

(58) Field of Classification Search
CPC . G01P 1/02; G01P 1/023; G01P 15/18; G01C 19/00; G01C 19/5783
See application file for complete search history.

(56) References Cited

U.S. PATENT DOCUMENTS

| | | | | |
|---|---|---|---|---|
| 4,179,818 A | * | 12/1979 | Craig | G01C 21/166 74/5.34 |
| 4,710,027 A | * | 12/1987 | Fersht | G01C 19/70 356/472 |
| 5,610,431 A | | 3/1997 | Martin | |
| 6,115,261 A | * | 9/2000 | Platt | H05K 3/301 73/431 |
| 7,253,079 B2 | | 8/2007 | Hanson et al. | |
| 12,078,487 B2 | * | 9/2024 | Akashi | G01C 19/18 |

(Continued)

FOREIGN PATENT DOCUMENTS

| | | |
|---|---|---|
| JP | 2003-028646 A | 1/2003 |
| JP | 2004-037105 A | 2/2004 |

(Continued)

*Primary Examiner* — Helen C Kwok
(74) *Attorney, Agent, or Firm* — Posz Law Group, PLC

(57) ABSTRACT

A multi-axis inertial force sensor includes a mounting material, blocks, and sensors. Each block has a positioning portion that determines its position relative to a contact partner. A pedestal is formed by an assembly of the blocks where the positions are determined relative to each other based on the positioning portion and where inclined surfaces are oriented in different directions. The sensors are respectively arranged on the inclined surfaces of the pedestal so that the main axes are oriented in different directions to detect vector components of inertial force corresponding to the main axes.

16 Claims, 20 Drawing Sheets

(56) References Cited

U.S. PATENT DOCUMENTS

| | | | | |
|---|---|---|---|---|
| 2003/0163282 A1* | 8/2003 | Krieg | G01C 21/183 | |
| | | | 702/152 | |
| 2003/0209789 A1* | 11/2003 | Hanson | G01C 21/166 | |
| | | | 257/678 | |
| 2006/0042382 A1* | 3/2006 | DCamp | G01P 1/00 | |
| | | | 73/493 | |
| 2009/0013783 A1* | 1/2009 | Andersson | G01P 15/18 | |
| | | | 73/504.03 | |
| 2009/0308157 A1* | 12/2009 | Eriksen | G01C 21/166 | |
| | | | 228/208 | |
| 2010/0058860 A1* | 3/2010 | Rutkiewicz | G01C 21/166 | |
| | | | 73/504.08 | |
| 2012/0193735 A1* | 8/2012 | Chen | H04R 19/04 | |
| | | | 257/416 | |
| 2013/0255402 A1* | 10/2013 | Koyama | G01P 15/097 | |
| | | | 73/862.625 | |
| 2013/0312518 A1* | 11/2013 | Renault | G01C 19/5691 | |
| | | | 73/504.08 | |
| 2014/0013843 A1 | 1/2014 | Buck et al. | | |
| 2015/0285873 A1* | 10/2015 | Cai | G01R 33/0206 | |
| | | | 324/252 | |
| 2023/0243656 A1* | 8/2023 | Akashi | G01C 19/5783 | |
| | | | 74/5.4 | |
| 2023/0324174 A1* | 10/2023 | Akashi | G01C 19/065 | |
| | | | 73/1.77 | |

FOREIGN PATENT DOCUMENTS

| | | |
|---|---|---|
| JP | 2006-337197 A | 12/2006 |
| JP | 2008-051628 A | 3/2008 |
| JP | 2013-044645 A | 3/2013 |

* cited by examiner

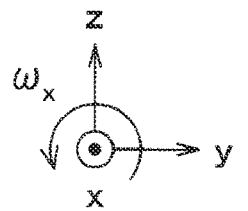
FIG. 16
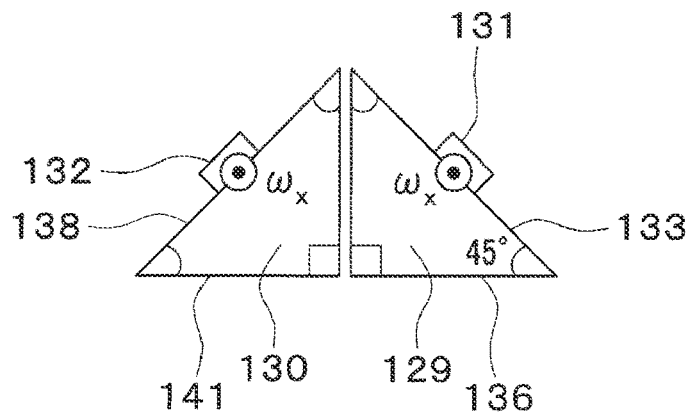
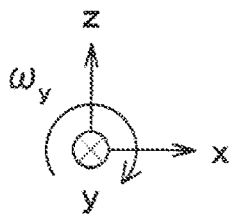
FIG. 17
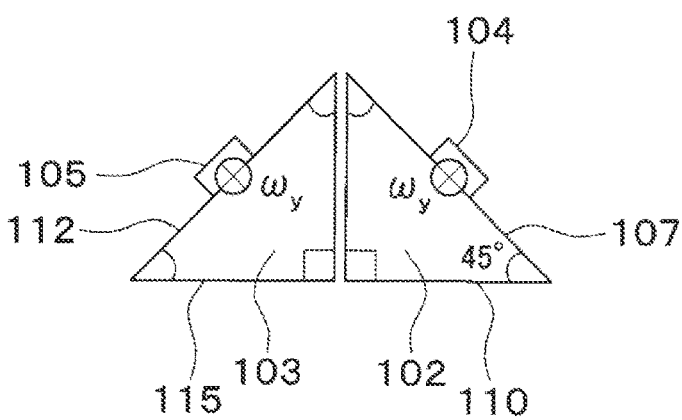
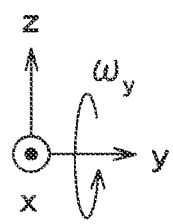
FIG. 18
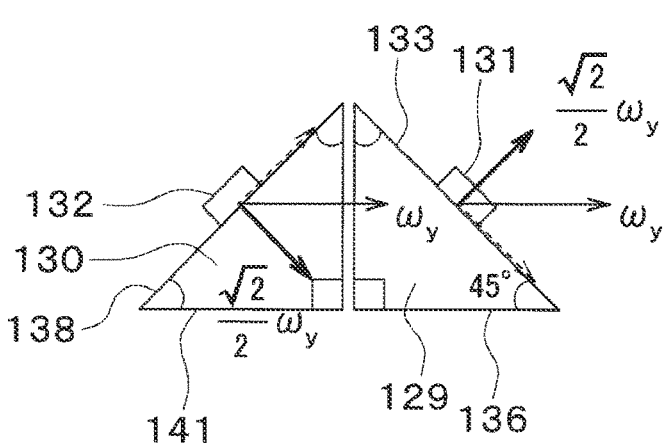

MULTI-AXIS INERTIAL FORCE SENSOR

CROSS REFERENCE TO RELATED APPLICATION

The present application is a continuation application of International Patent Application No. PCT/JP2021/037996 filed on Oct. 14, 2021, which designated the U.S. and claims the benefit of priority from Japanese Patent Application No. 2020-185625 filed on Nov. 6, 2020. The entire disclosures of all of the above applications are incorporated herein by reference.

TECHNICAL FIELD

The present disclosure relates to a multi-axis inertial force sensor.

BACKGROUND

Plural sensors are mounted on a pedestal fixed to a mounting surface of a substrate. The pedestal is a truncated pyramid having plural mounting surfaces. Each mounting surface is slanted with respect to the mounting surface of the substrate. Each sensor is arranged on each mounting surface. Thus, motions around multiple detection axes can be detected.

SUMMARY

According to one aspect of the present disclosure, a multi-axis inertial force sensor includes a mounting material, multiple blocks, and multiple sensors. The mounting material has an installation surface. The blocks are arranged on the installation surface of the mounting material and have inclined surfaces that are inclined with respect to the installation surface. The sensors are arranged on the inclined surfaces of the plurality of blocks, respectively, and detect an inertial force corresponding to the main axis. The blocks have a positioning portion that relatively determines a position of a contact partner in contact with at least one or more of the blocks. The blocks constitute a pedestal by being assembled in a state where the relative positions are determined based on the positioning portion and where the inclined surfaces are oriented in different directions. The sensors are respectively arranged on the inclined surfaces of the pedestal so that the main axes are oriented in different directions, and detect vector components of an inertial force corresponding to the main axes.

BRIEF DESCRIPTION OF DRAWINGS

The above and other objects, features and advantages of the present disclosure will be more clearly understood from the following detailed description with reference to the accompanying drawings. In the accompanying drawings:

FIG. 16 is a diagram showing vector components when a roll is applied to the third and fourth sensors;

FIG. 17 is a diagram showing vector components when a pitch is applied to first and second sensors;

FIG. 18 is a diagram showing vector components when a pitch is applied to the third and fourth sensors;

DETAILED DESCRIPTION

Figure 1:
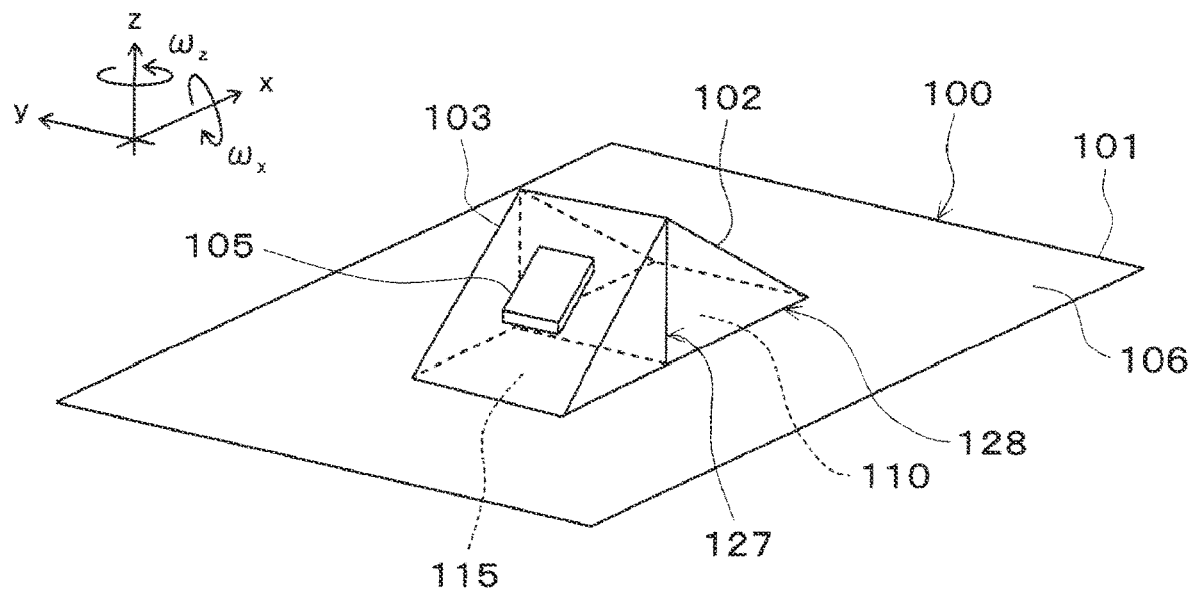
FIG. 1 is a perspective view illustrating a multi-axis inertial force sensor according to a first embodiment.

Conventionally, a device in which plural sensors are mounted on a pedestal has been proposed. Specifically, the pedestal is fixed to a mounting surface of a substrate. The pedestal is a truncated pyramid having plural mounting surfaces. Each mounting surface is slanted with respect to the mounting surface of the substrate. Each sensor is arranged on each mounting surface. Thus, motions around multiple detection axes can be detected.

However, in the conventional technique described above, a sensor must be mounted on each mounting surface of the pedestal. Since the orientations of the mounting surface are different from each other, it is difficult and complicated to mount the plural sensors on the single pedestal.

Moreover, since the pedestal has the plural mounting surfaces, the shape of the pedestal is complicated and the processing of the pedestal takes time. As a result, the cost of the device increases.

The present disclosure provides a multi-axis inertial force sensor having a configuration that facilitates installation of plural sensors on a pedestal and reduces costs.

According to one aspect of the present disclosure, a multi-axis inertial force sensor includes a mounting material, multiple blocks, and multiple sensors.

The mounting material has an installation surface. The blocks are arranged on the installation surface of the mounting material and have inclined surfaces that are inclined with respect to the installation surface. The sensors are arranged on the inclined surfaces of the plurality of blocks, respectively, and detect an inertial force corresponding to the main axis.

The blocks have a positioning portion that relatively determines a position of a contact partner in contact with at least one or more of the blocks. The blocks constitute a pedestal by being assembled in a state where the relative positions are determined based on the positioning portion and where the inclined surfaces are oriented in different directions.

The sensors are respectively arranged on the inclined surfaces of the pedestal so that the main axes are oriented in different directions, and detect vector components of an inertial force corresponding to the main axes.

Accordingly, since one sensor is installed for one block, it is possible to easily install the sensor for the block. The multi-axis can be realized by constructing the pedestal in which the blocks are combined. In addition, since it is not necessary to form plural inclined surfaces in one block, formation and processing of the block are facilitated. Therefore, the cost of the multi-axis inertial force sensor can be reduced.

Hereinafter, embodiments for carrying out the present disclosure will be described with reference to the drawings. In each embodiment, portions corresponding to those described in the preceding embodiment are denoted by the same reference numerals, and overlapping descriptions may be omitted. In a case where only a part of a configuration is described in each embodiment, the other embodiments described above are capable of being applied for the other parts of the configuration. Not only a combination of parts that are specifically indicated as combinable in each embodiment but also a partial combination of embodiments without being explicitly indicated is possible when no particular obstacle to the combination arises.

First Embodiment

Figure 2:
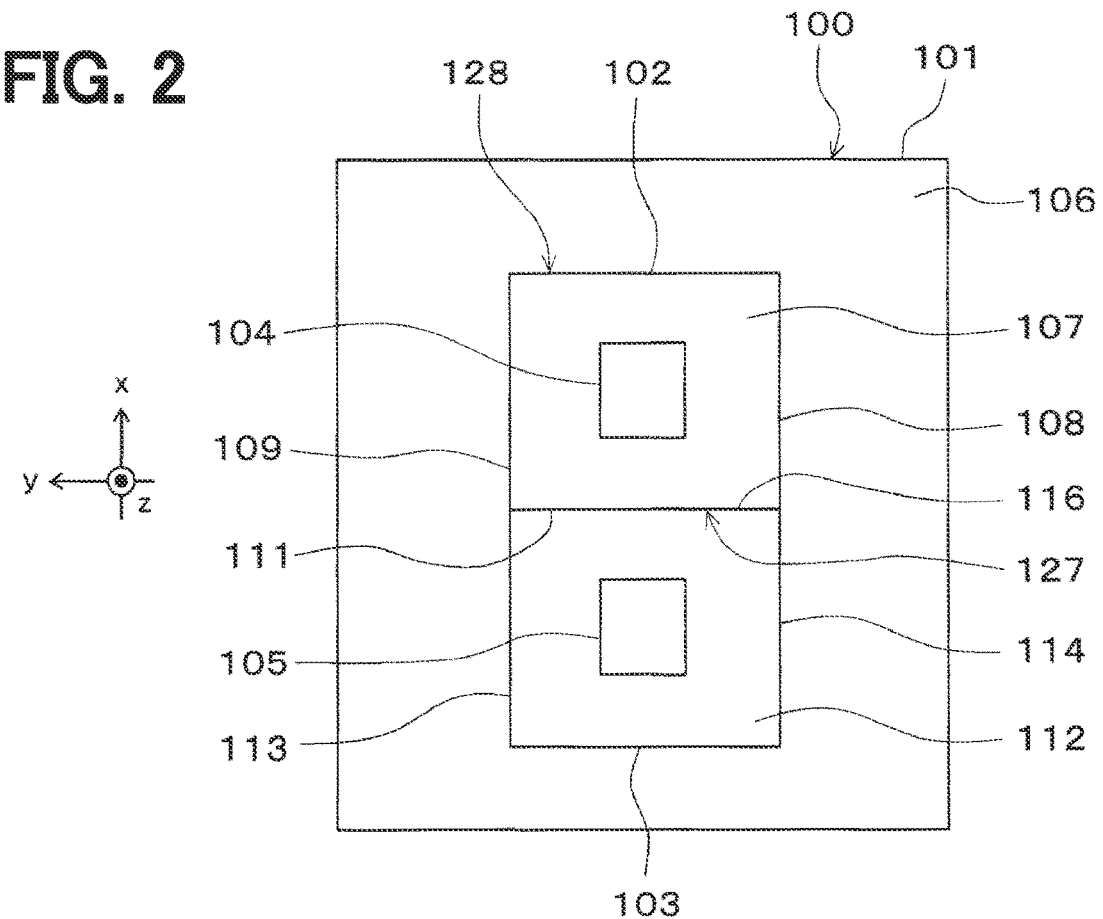
FIG. 2 is a top view of the multi-axis inertial force sensor shown in FIG. 1.

A first embodiment will be described with reference to the drawings. As shown in FIGS. 1 and 2, a multi-axis inertial force sensor 100 includes a mounting material 101, a first block 102, a second block 103, a first sensor 104 and a second sensor 105.

The mounting material 101 has an installation surface 106. The installation surface 106 is flat. The mounting material 101 is, for example, a single-layer or multilayer printed circuit board. Electronic components such as a microcomputer and LSI (Large Scale Integration) are mounted on the mounting material 101. The mounting material 101 is housed in a housing (not shown).

The blocks 102, 103 are bases on which the sensors 104, 105 are respectively placed. Each of the blocks 102, 103 is arranged on the installation surface 106 of the mounting material 101. Each of the blocks 102, 103 is of the same size and shape. Each of the blocks 102, 103 need not be a solid member. Each of the blocks 102, 103 may be partially hollowed out or hollow inside. Each of the blocks 102, 103 is made of a material such as metal, resin, or ceramics.

As shown in FIG. 1, the first block 102 is a triangular prism having an inclined surface 107, a pair of end surfaces 108, 109, and a pair of side surfaces 110, 111. The inclined surface 107 is inclined with respect to the installation surface 106 of the mounting material 101. The end surfaces 108, 109 are triangular surfaces connected to the inclined surface 107. The side surfaces 110, 111 are square surfaces connected to the inclined surface 107 and the pair of end surfaces 108, 109. One side surface 110 of the side surfaces 110, 111 is arranged on the installation surface 106 of the mounting material 101.

The end surfaces 108, 109 are in the shape of an isosceles right triangle. The inclined surface 107 corresponds to an oblique side of the end surface 108, 109 shaped in the isosceles right triangle. Therefore, the inclined surface 107 is inclined at an angle of 45° with respect to the installation surface 106 of the mounting material 101.

The second block 103, similarly to the first block 102, is a triangular prism having an inclined surface 112, a pair of end surfaces 113, 114, and a pair of side surfaces 115, 116. Since the block 102, 103 is shaped like a simple triangular prism, it is possible to mass-produce by injection molding. Therefore, the manufacturing cost of each block 102, 103 can be suppressed.

Figure 3:
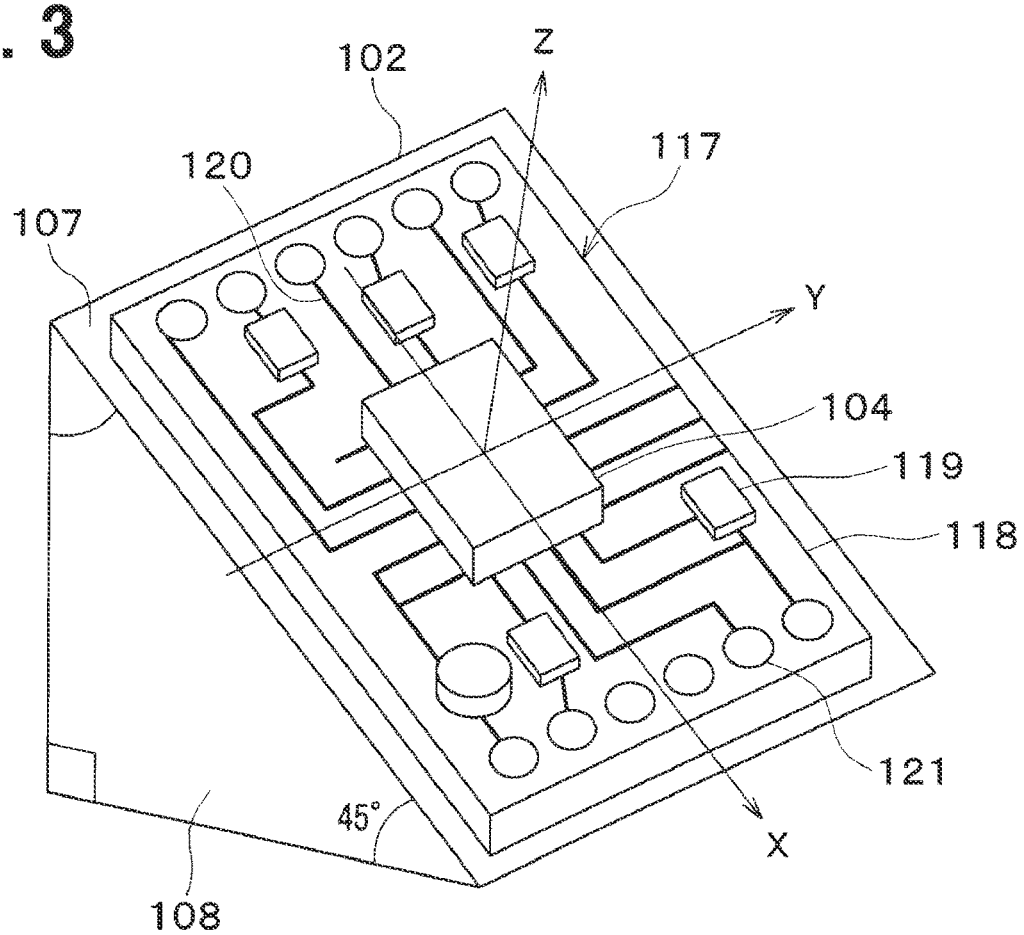
FIG. 3 is a perspective view showing a first sensor installed in a first block.

As shown in FIG. 3, the first block 102 has electronic components 117 provided on the inclined surface 107. The electronic components 117 include a mounting board 118, an external component 119, an external wiring 120, and a lead-out portion 121.

The mounting board 118 is, for example, a printed circuit board. The first sensor 104 is mounted on the mounting board 118 by soldering. The mounting board 118 is fixed to the inclined surface 107 with an adhesive or the like.

The external component 119 is a component such as a chip resistor. The external wiring 120 is formed on the surface of the mounting board 118 and connected to the first sensor 104 and the external component 119.

The lead-out portion 121 is connected to the external wiring 120. The lead-out portion 121 is an electrical connection portion for transmitting a signal from the first sensor 104 to the outside and for supplying power to the first sensor 104 from the outside. The lead-out portion 121 is connected to an electrical circuit of the mounting material 101. A socket for a flexible substrate may be used as the lead-out portion 121.

The electronic component 117 and the second sensor 105 are mounted on the second block 103 in the same manner as described above. That is, the sensors 104, 105 are arranged on the inclined surfaces 107, 112 of the blocks 102, 103, respectively. That is, one first sensor 104 is arranged on the first block 102 and one second sensor 105 is arranged on the second block 103.

In FIGS. 1 and 2, the electronic component 117 arranged on each of the blocks 102 and 103 is omitted. The electronic component 117 disposed on each of the blocks 102 and 103 is also omitted in the following figures as appropriate.

Each of the sensors 104 and 105 is a single axis gyro sensor that detects angular velocity as inertial force corresponding to the main axis. If a direction perpendicular to the inclined surface 107, 112 of the block 102, 103 is defined as Z-axis, the main axis of the sensor 104, 105 is arranged parallel to the Z-axis. Therefore, each sensor 104, 105 detects the angular velocity around the Z-axis as inertial force.

Each sensor 104, 105 is configured as, for example, a resin mold package. A sensor element and an ASIC (Application Specific Integrated Circuit) are included in the package. The sensor element is preferably configured as a WLP (Wafer Level Packaging). In other words, a sensor element and an IC (Integrated Circuit) configured to operate the sensor element and read a signal are collectively called a gyro sensor. Note that each of the sensors 104 and 105 may be configured as a ceramic package. The package may be open.

Figure 4:
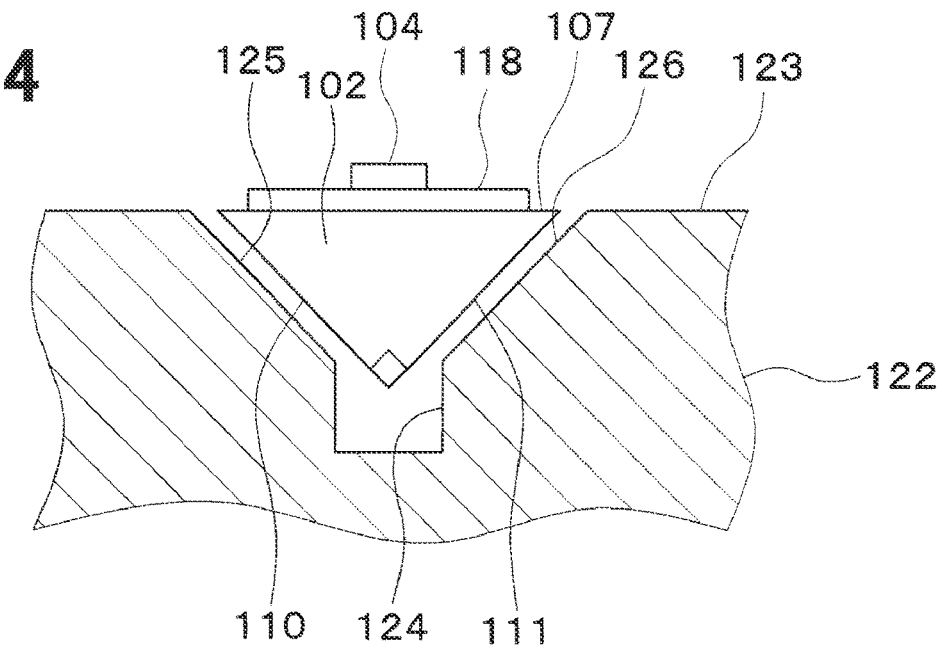
FIG. 4 is a partial cross-sectional view showing the first block installed in a fitting plate.

As shown in FIG. 4, the mounting board 118 with the first sensor 104 mounted thereon is fixed to the first block 102 using the fitting plate 122. The fitting plate 122 has a flat surface 123 and a groove 124. The groove 124 is a recessed portion of the flat surface 123 of the fitting plate 122. The groove 124 has substantially the same shape as the outer shape of the first block 102. The groove 124 has at least wall surfaces 125 and 126 with which the side surfaces 110 and 111 of the first block 102 contact.

The first block 102 is fitted into the groove 124 so that the side surfaces 110 and 111 are in contact with the wall surfaces 125 and 126 of the groove 124. As a result, the inclined surface 107 of the first block 102 becomes parallel to the flat surface 123 of the fitting plate 122. The inclined surface 107 of the first block 102 is arranged horizontally by horizontally fixing the flat surface 123 of the fitting plate 122 in advance. In this state, the mounting board 118 and the first sensor 104 are mounted on the first block 102 by a board mounting technique, a reflow mounting technique, or the like.

The first sensor 104 is a Z-axis gyro sensor. Therefore, in mounting the first sensor 104 on the first block 102, the axial deviation of the main axis, that is, the Z-axis direction with respect to the inclined surface 107 does not increase without precisely controlling the deviation in both of the first other axis perpendicular to the main axis and the second other axis perpendicular to the main axis and the first other axis. The first other axis is the X-axis. The second other axis is the Y-axis. For the second block 103 as well, the electronic component 117 and the second sensor 105 are mounted using the fitting plate 122 in the same manner as described above.

When the main axis of the sensor 104, 105 is the X-axis or the Y-axis, it is necessary to mount the sensor 104, 105 in a state where the position of the sensor 104, 105 is controlled for the block 102, 103.

In the above configuration, as shown in FIGS. 1 and 2, the block 102, 103 is assembled on the installation surface 106 of the mounting material 101. The axis perpendicular to the installation surface 106 of the mounting material 101 is defined as z-axis. A direction perpendicular to the z-axis and parallel to the installation surface 106 is defined as x-axis. A direction perpendicular to the z-axis and the x-axis and parallel to the installation surface 106 is defined as y-axis. The x-axis and the y-axis are parallel to the installation surface 106. The blocks 102, 103 are aligned along the x-axis.

Each of the blocks 102 and 103 has a positioning portion 127 that relatively determines the position of the contact partner in contact with. The positioning portion 127 is an abutting portion where the blocks 102 and 103 are in contact with each other as the contact partner. The positioning portion 127 is a contact portion in contact with the contact partner.

The blocks 102 and 103 are assembled in a state where the relative positions are determined based on the positioning portion 127. Also, the blocks 102, 103 are assembled in a state where the inclined surfaces 107, 112 are oriented in different directions. Thereby, the blocks 102, 103 constitutes a pedestal 128. The blocks 102, 103 are connected with each other by an adhesive.

The multi-axis is achieved by assembling the blocks 102, 103. That is, the multi-axis inertial force sensor 100 is a two-axis gyro sensor. The positioning portion 127 defines the accuracy of the relative position between the sensors 104, 105. The axial orthogonality of the sensors 104 and 105 is sufficiently guaranteed by managing the machining shape of each block 102, 103 and ensuring the shape accuracy of each block 102, 103.

The sensors 104 and 105 are arranged on the inclined surfaces 107 and 112 of the pedestal 128, respectively, so that the main axes are oriented in different directions. That is, the main axis of the sensor 104, 105 is inclined with respect to the installation surface 106 of the mounting material 101. Therefore, each sensor 104, 105 detects the vector component of the angular velocity corresponding to the main axis.

In this embodiment, the pedestal 128 is configured by arranging the blocks 102 and 103 point-symmetrically with respect to a reference point on the installation surface 106 of the mounting material 101. The pedestal 128 is assembled so that the other side surface 111 of the first block 102 and the other side surface 116 of the second block 103 face each other. Thereby, the pedestal 128 forms a chevron shape. Further, the blocks 102 and 103 are assembled without gaps by contacting the side surfaces 111 and 116. The above is the overall configuration of the multi-axis inertial force sensor 100.

Next, the principle of detecting two-axis angular velocities will be described. First, the angular velocity about the z-axis is defined as yaw, and the angular velocity about the x-axis is defined as roll. Each sensor 104, 105 determines the rotational direction of the angular velocity from the direction in which the angular velocity is applied.

Figure 5:
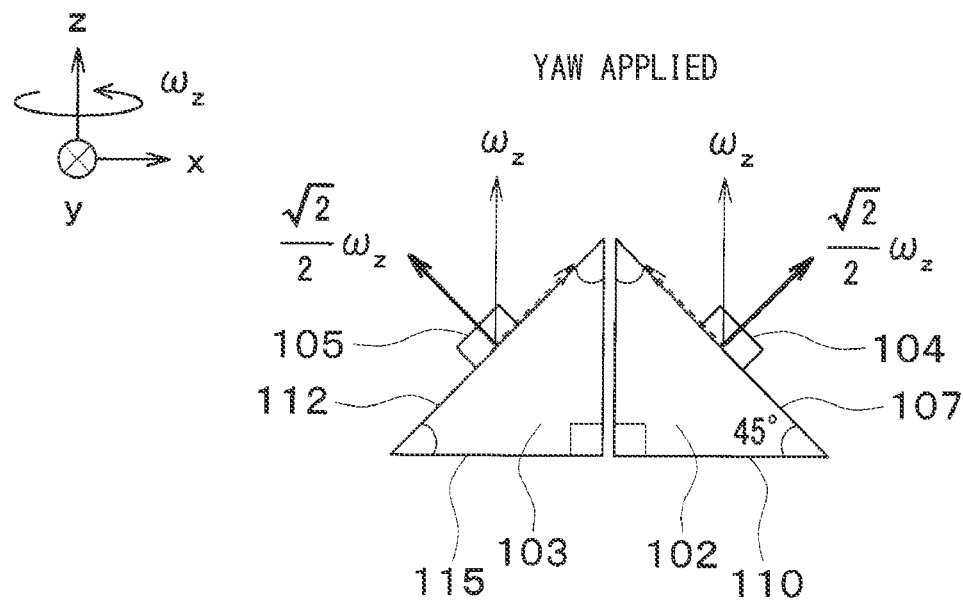
FIG. 5 is a diagram showing vector components when a yaw is applied to each sensor.

Specifically, as shown in FIG. 5, when a yaw is applied to the multi-axis inertial force sensor 100, an angular velocity $\omega_z$ is applied to each sensor 104, 105. Since the inclined surface 107, 112 of the block 102, 103 is inclined at an angle of 45° with respect to the z-axis, the vector decomposition of the angular velocity $\omega_z$ yields a vector component of $\sqrt{2}\omega_z/2$ applied on the Z-axis of each sensor 104, 105. Although an angular velocity of $\sqrt{2}\omega_z/2$ is added to the other axis, there is no effect on the sensitivity for the main axis of each sensor 104, 105.

Figure 6:
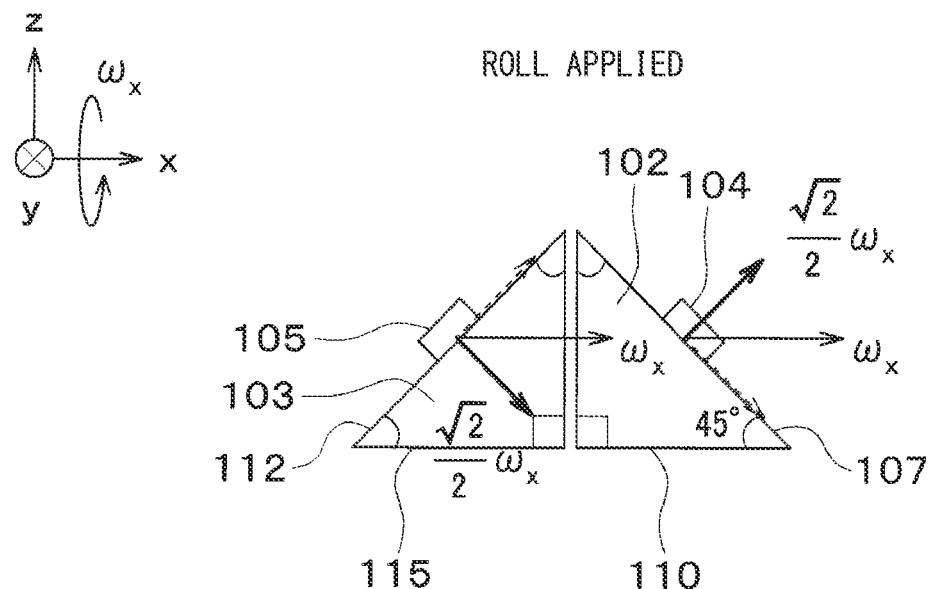
FIG. 6 is a diagram showing vector components when a roll is applied to each sensor.

As shown in FIG. 6, when a roll is applied to the multi-axis inertial force sensor 100, an angular velocity $\omega_x$ is applied to each sensor 104, 105. When the angular velocity $\omega_x$ is vector-decomposed in the same manner as described above, a vector component of $\sqrt{2}\omega_x/2$ is applied to the Z-axis of the sensor 104, 105. Although an angular velocity of $\sqrt{2}\omega_x/2$ is applied to the other axis, there is no effect on the sensitivity for the main axis of each sensor 104, 105.

In this embodiment, each block 102, 103 is arranged along the x-axis. Therefore, when the angular velocity applied around the x-axis and around the z-axis are vector-decomposed as described above, it is possible to detect the angular velocity around the Z-axis and the direction of the angular velocity. That is, since each sensor 104, 105 is a Z-axis gyro sensor, it functions as an x-axis and z-axis gyro sensor. Therefore, two-axis angular velocities around the x-axis and around the z-axis can be detected.

When the blocks 102, 103 are arranged along the y-axis, it is possible to detect two-axis angular velocities around the y-axis and around the z-axis.

As described above, in this embodiment, the sensors 104 and 105 are installed in the blocks 102 and 103, respectively. That is, it suffices to mount one sensor 104, 105 on one block 102, 103. Therefore, it becomes very easy to mount the plural sensors 104 and 105 on the pedestal 128. Also, it is not necessary to form plural inclined surfaces on one block 102, 103. Therefore, formation and processing of the block 102, 103 are facilitated, and the cost of the multi-axis inertial force sensor 100 can be reduced.

Since the blocks 102, 103 each having the single axis sensor 104, 105 are assembled, the angular velocities around the x-axis and the z-axis can be detected by the two sensors 104 and 105, respectively.

Also, the pedestal 128 is configured by assembling the blocks 102 and 103. Therefore, the orthogonality of the main axes of the sensors 104, 105 can be maintained with high accuracy. That is, it is possible to maintain the sensor accuracy for each detection axis. Since the inclination angle of the inclined surface 107, 112 of the block 102, 103 is 45°, it is also advantageous that the matrix operation, which is a factor of deteriorating the accuracy, can be equally divided.

Furthermore, since the block 102, 103 has high strength, strain generated in the mounting material 101 is less likely to be transmitted to the sensor 104, 105 via the block 102, 103. Therefore, the robustness of each sensor 104, 105 can be improved against externally generated strain, that is, stress.

As a modification, each sensor 104, 105 may be configured as a single axis acceleration sensor that has its main axis parallel to the Z-axis to detect acceleration in the Z-axis direction as inertial force. The acceleration sensor may be configured with the X-axis and the Y-axis as main axis. The implementation of each sensor 104, 105 for each block 102, 103 is the same as the method shown in FIG. 4. When there are two sensors 104 and 105, a two-axis acceleration sensor is configured. In the same manner as described above, it is possible to detect acceleration along two axes such as the x-axis and the z-axis.

Figure 7:
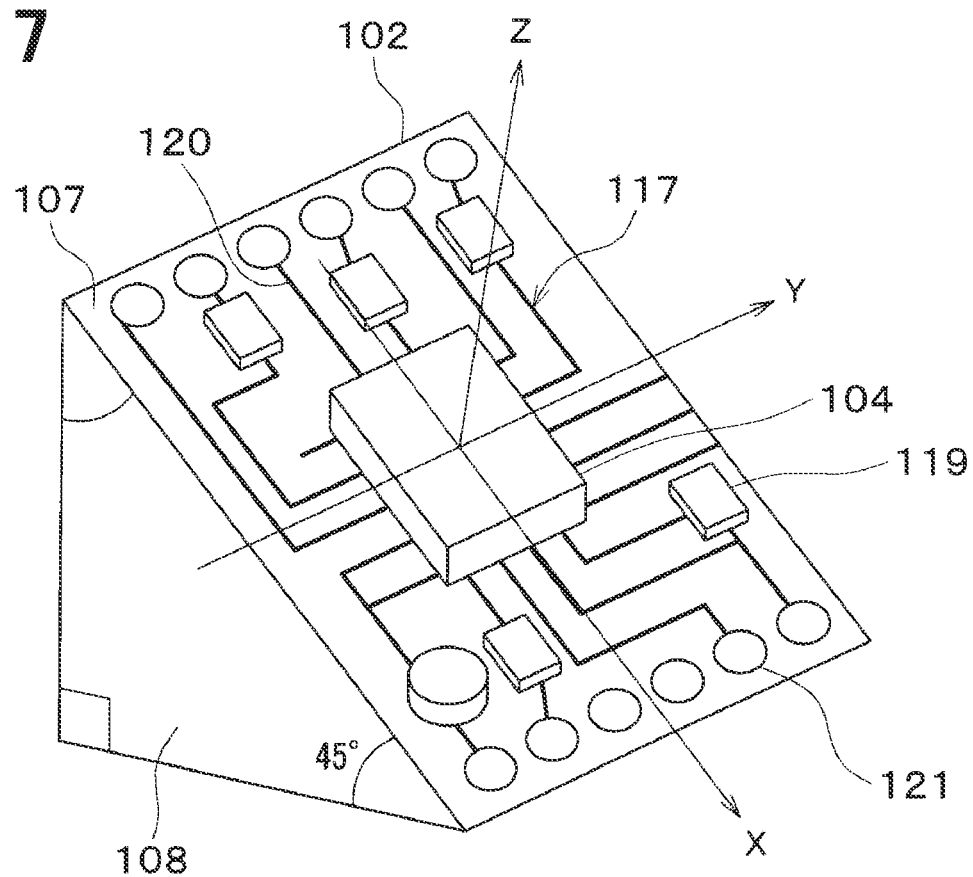
FIG. 7 is a diagram showing a modification in each block of the first embodiment.

As a modification, as shown in FIG. 7, the first sensor 104, the external component 119, the external wiring 120, and the lead-out portion 121 may be directly mounted on the inclined surface 107 of the first block 102. In this case, the mounting board 118 is not included in the electronic component 117. The same applies to the second block 103 as well. Each block 102, 103 is manufactured by injection molding of thermoplastic resin. The external wiring 120 and electrodes are formed by a MID (Molded Interconnect Device) method. That is, each block 102, 103 serves as the mounting board 118.

Figure 8:
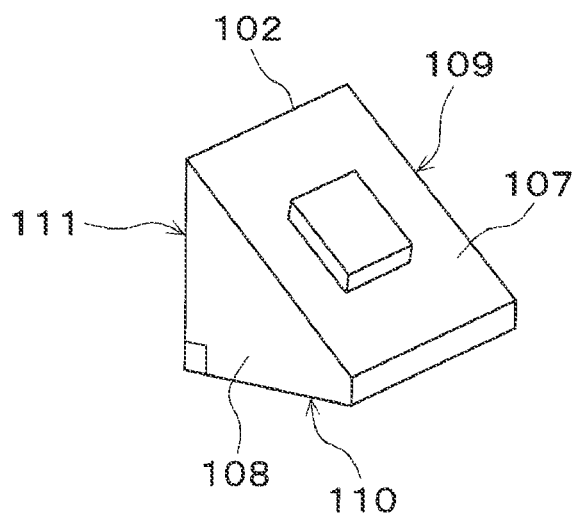
FIG. 8 is a diagram showing a modification in each block of the first embodiment.

As a modification, as shown in FIG. 8, the first block 102 has a corner formed by the inclined surface 107 and the side surface 110, and the tip of the corner may be chamfered. The same applies to the second block 103 as well.

Figure 9:
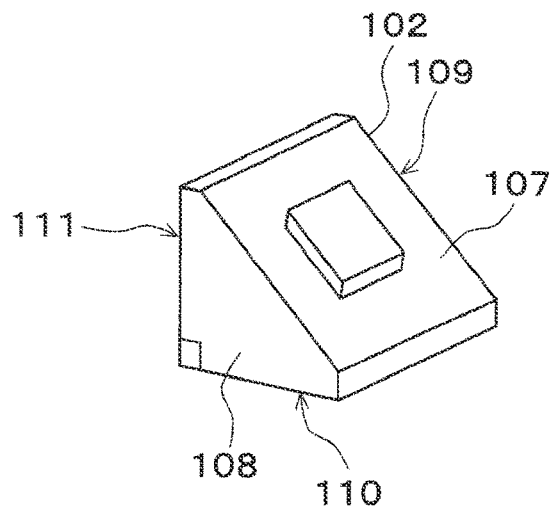
FIG. 9 is a diagram showing a modification in each block of the first embodiment.

As a modification, as shown in FIG. 9, the first block 102 has a corner formed by the inclined surface 107 and the side surface 110 and a corner formed by the inclined surface 107 and the side surface 111, and the tips of the two corners may be chamfered. The same applies to the second block 103 as well.

Figure 10:
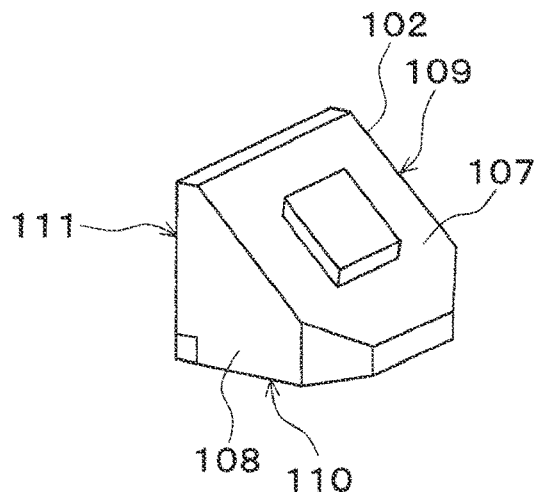
FIG. 10 is a diagram showing a modification in each block of the first embodiment.

As a modification, as shown in FIG. 10, in the shape of the first block 102 shown in FIG. 9, a corner formed by the inclined surface 107, the end surface 108, and the side surface 110 may be chamfered. Also, a corner of the first block 102 formed by the inclined surface 107, the end surface 109, and the side surface 110 may be chamfered. The same applies to the second block 103 as well.

Second Embodiment

Figure 11:
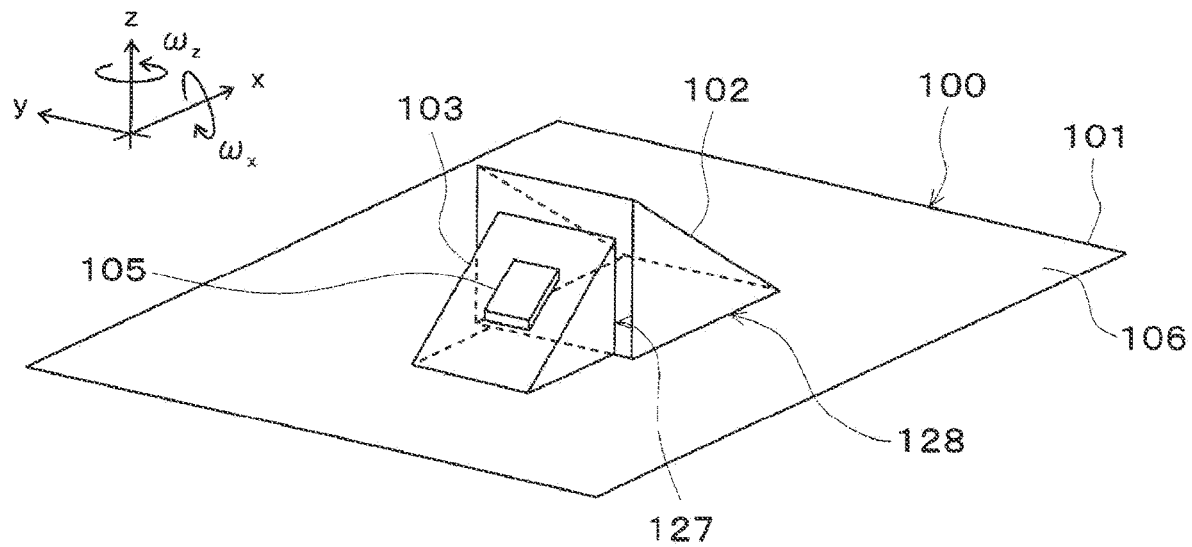
FIG. 11 is a perspective view illustrating a multi-axis inertial force sensor according to a second embodiment.
Figure 12:
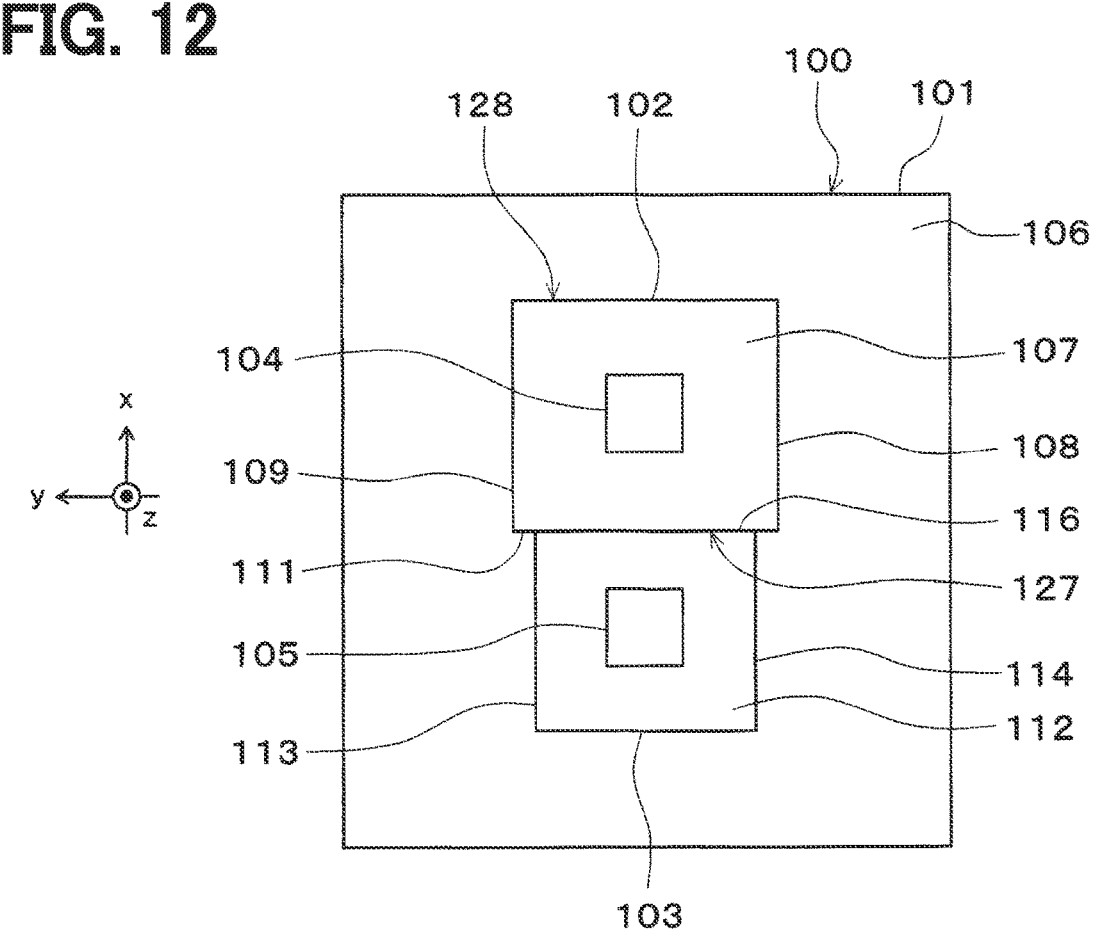
FIG. 12 is a top view of the multi-axis inertial force sensor shown in FIG. 11.

In the present embodiment, portions different from those of the first embodiment will be mainly described. As shown in FIGS. 11 and 12, the blocks 102, 103 have the same shape but are different in size.

Specifically, the first block 102 is larger than the second block 103. The center position of the first block 102 and the center position of the second block 103 are arranged at the same position in the y-axis direction. Accordingly, the positioning portion 127 is composed of a part of the other side surface 111 of the first block 102 in contact with the second block 103 and the entire other side surface 116 of the second block 103.

The angular velocities around the x-axis and the z-axis can be detected as in the first embodiment, while the blocks 102 and 103 have different sizes.

As a variant, the first block 102 may be smaller than the second block 103. The center position of the first block 102 and the center position of the second block 103 may be different in the y-axis direction. For example, the blocks 102 and 103 may be arranged such that the one end surface 108 of the first block 102 and the other end surface 114 of the second block 103 are flush with each other. The sensors 104 and 105 are preferably arranged on a straight line along the x-axis.

Third Embodiment

Figure 13:
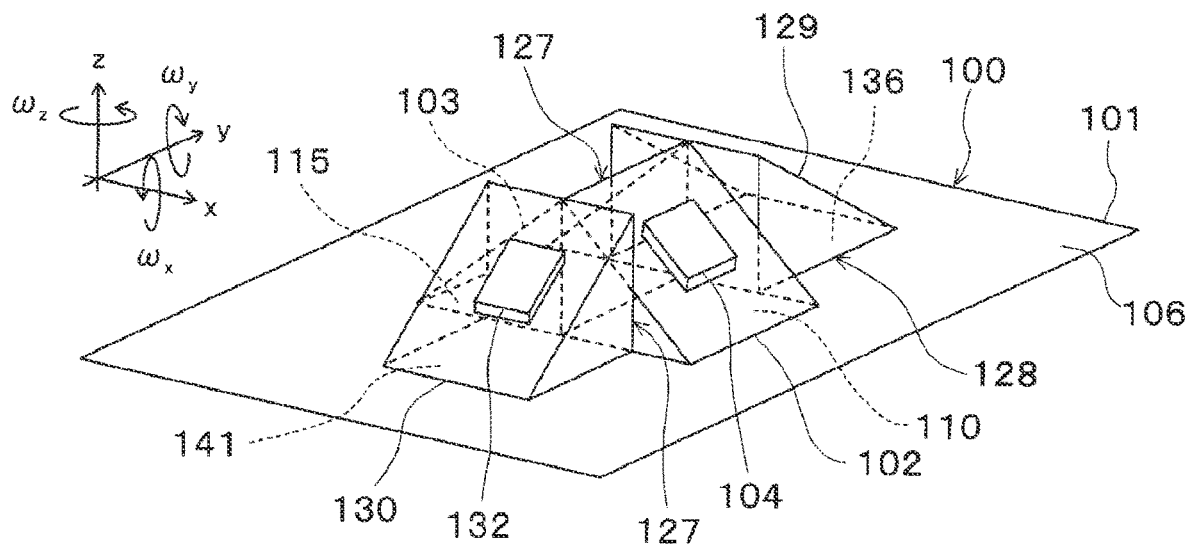
FIG. 13 is a perspective view illustrating a multi-axis inertial force sensor according to a third embodiment.
Figure 14:
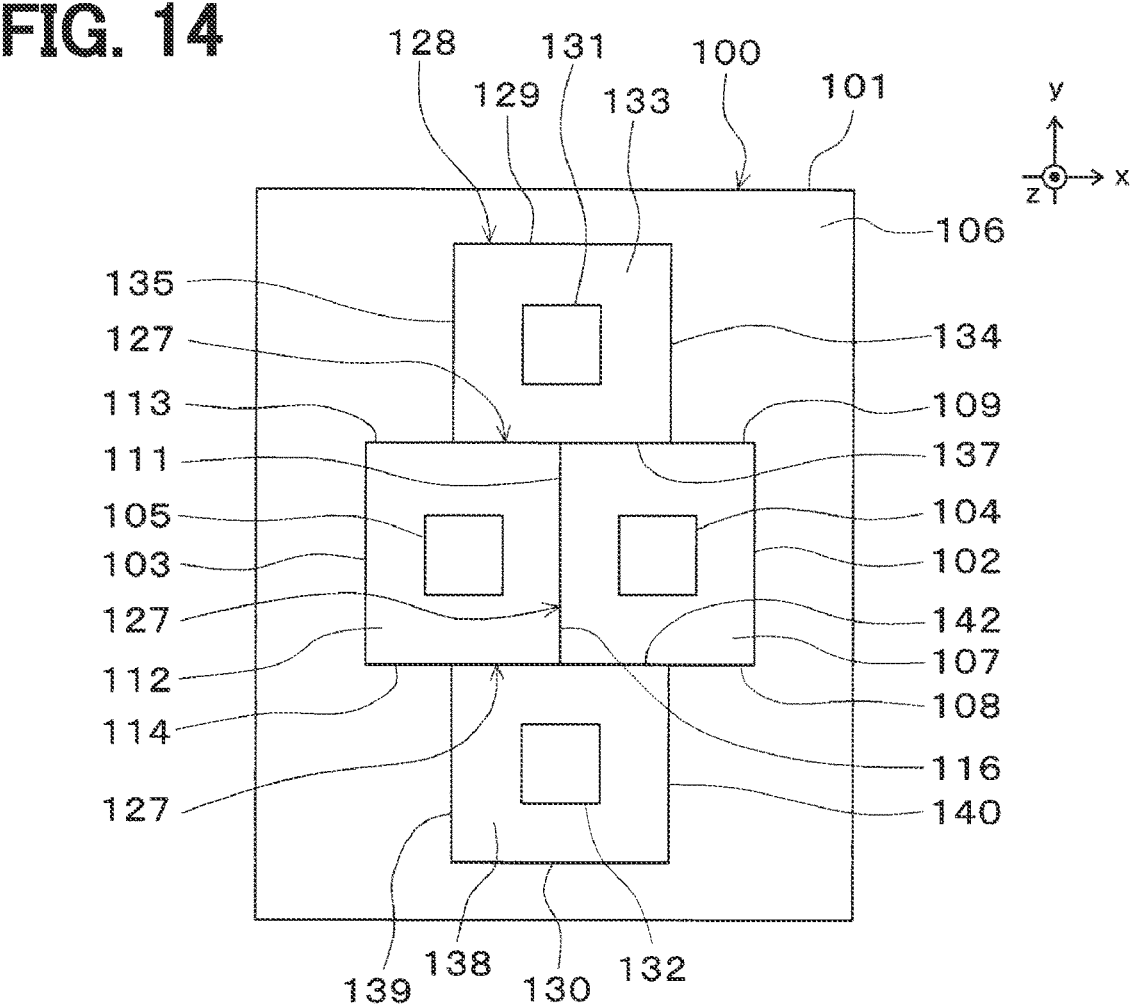
FIG. 14 is a top view of the multi-axis inertial force sensor shown in FIG. 13.

In the present embodiment, portions different from the respective embodiments described above will be described. As shown in FIGS. 13 and 14, the multi-axis inertial force sensor 100 includes a third block 129, a fourth block 130, a third sensor 131, a fourth sensor 132 in addition to the blocks 102 and 103 and the sensors 104 and 105.

The third block 129 is a triangular prism having an inclined surface 133, a pair of end surfaces 134, 135 and a pair of side surfaces 136, 137. The fourth block 130 is a triangular prism having an inclined surface 138, a pair of end surfaces 139, 140 and a pair of side surfaces 141, 142.

The blocks 102, 103, 129 and 130 are all the same size and the same shape. As in the above embodiments, the third sensor 131 is arranged on the inclined surface 133 of the third block 129 together with the electronic component 117, and the fourth sensor 132 is arranged on the inclined surface 138 of the fourth block 130 together with the electronic component 117.

The pedestal 128 is assembled in a chevron shape in which the first block 102 and the second block 103 are interposed between the third block 129 and the fourth block 130. Specifically, the first block 102 and the second block 103 are arranged along the x-axis. Further, the other side surface 111 of the first block 102 and the other side surface 116 of the second block 103 face each other and are arranged without a gap.

The third block 129 and the fourth block 130 are arranged along the y-axis. The other side surface 137 of the third block 129 faces the other end surface 109 of the first block 102 and the one end surface 113 of the second block 103 without a gap. The other side surface 142 of the fourth block 130 faces the one end surface 108 of the first block 102 and the other end surface 114 of the second block 103 without a gap.

The sensors 104, 105, 131, 132 are arranged on the inclined surfaces 107, 112, 133, 138 of the pedestal 128, respectively, so that the main axes are oriented in different directions. The positioning portion 127 is formed by a part of the end surfaces 108, 109 and the other side surface 111 of the first block 102 and a part of the end surfaces 113, 114 and the other side surface 116 of the second block 103. Further, the positioning portion 127 is formed by a part of the other side surface 137 of the third block 129 and a part of the other side surface 142 of the fourth block 130. As a result, the orthogonal accuracy of the main axes of the sensors 104, 105, 131, 132 is guaranteed by the shape accuracy of the blocks 102, 103, 129, 130.

Next, the principle of detecting three-axis angular velocities will be described. First, let the angular velocity around the y-axis be a pitch. Each sensor 104, 105, 131, 132 is a single-axis gyro sensor that detects an angular velocity around the Z-axis.

When a yaw is applied to the multi-axis inertial force sensor 100, an angular velocity $\omega_z$ is applied to each sensor 104, 105, 131, 132. As in the case shown in FIG. 5, when the angular velocity $\omega_z$ is vector-decomposed, a vector component of $\sqrt{2}\omega_z/2$ is applied to the Z-axis of the first sensor 104 and the second sensor 105.

Figure 15:
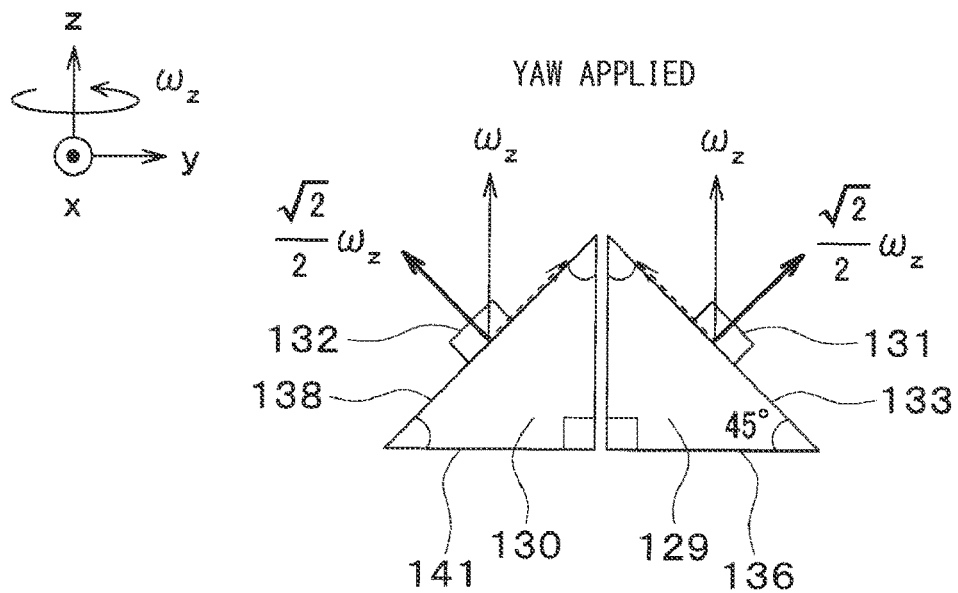
FIG. 15 is a diagram showing vector components when a yaw is applied to third and fourth sensors.

As shown in FIG. 15, a vector component of $\sqrt{2}\omega_z/2$ is applied to the Z-axis of the third sensor 131 and the fourth sensor 132. That is, an angular velocity of $\sqrt{2}\omega_z/2$ is applied to the Z-axis of the four sensors 104, 105, 131, 132. Since the inclined surfaces 133, 138 of the third sensor 131 and the fourth sensor 132 are inclined at an angle of 45° with respect to the installation surface 106 of the mounting material 101, the main-axis sensitivity of each sensor 131, 132 is not affected while the angular velocities, which are equally divided, are added to the other axes of the sensors 131 and 132.

When a roll is applied to the multi-axis inertial force sensor 100, an angular velocity $\omega_x$ is applied to each sensor 104, 105, 131, 132. As in the case shown in FIG. 6, when the angular velocity $\omega_x$ is vector-decomposed, a vector component of $\sqrt{2}\omega_x/2$ is applied to the Z-axis of the first sensor 104 and the second sensor 105. Therefore, the rotational direction of the angular velocity $\omega_x$ can be determined from the direction in which the angular velocity $\omega_x$ is applied.

As shown in FIG. 16, the angular velocity $\omega_x$ is applied to the second other axis of the third sensor 131 and the fourth sensor 132. Therefore, the main-axis sensitivities of the third sensor 131 and the fourth sensor 132 do not change.

When a pitch is applied to the multi-axis inertial force sensor 100, an angular velocity $\omega_y$ is applied to each sensor 104, 105, 131, 132. As shown in FIG. 17, when the angular velocity $\omega_y$ is subjected to vector decomposition, the angular velocity $\omega_y$ is applied to the second other axis of the first sensor 104 and the second sensor 105. Therefore, the main-axis sensitivities of the first sensor 104 and the second sensor 105 do not change.

As shown in FIG. 18, the vector decomposition of the angular velocity $\omega_y$ yields a vector component of $\sqrt{2}\omega_y/2$ applied to the Z-axis of the third sensor 131 and the fourth sensor 132. Although an angular velocity of $\sqrt{2}\omega_y/2$ is added to the other axis, there is no effect on the main-axis sensitivities of the third sensor 131 and the fourth sensor 132. Therefore, the rotational direction of the angular velocity $\omega_y$ can be determined from the direction in which the angular velocity $\omega_y$ is applied.

Based on the above principle, three-axis angular velocities can be detected. Also, even if one of the sensors 104, 105, 131, 132 breaks down, the remaining three sensors can be used to detect three-axis angular velocities. That is, redundancy can be ensured.

As a modification, an acceleration sensor having the Z-axis as the main axis may be employed as the sensor 104, 105, 131, 132. In this case as well, accelerations in the three axial directions can be detected based on the same principle as above.

Fourth Embodiment

Figure 19:
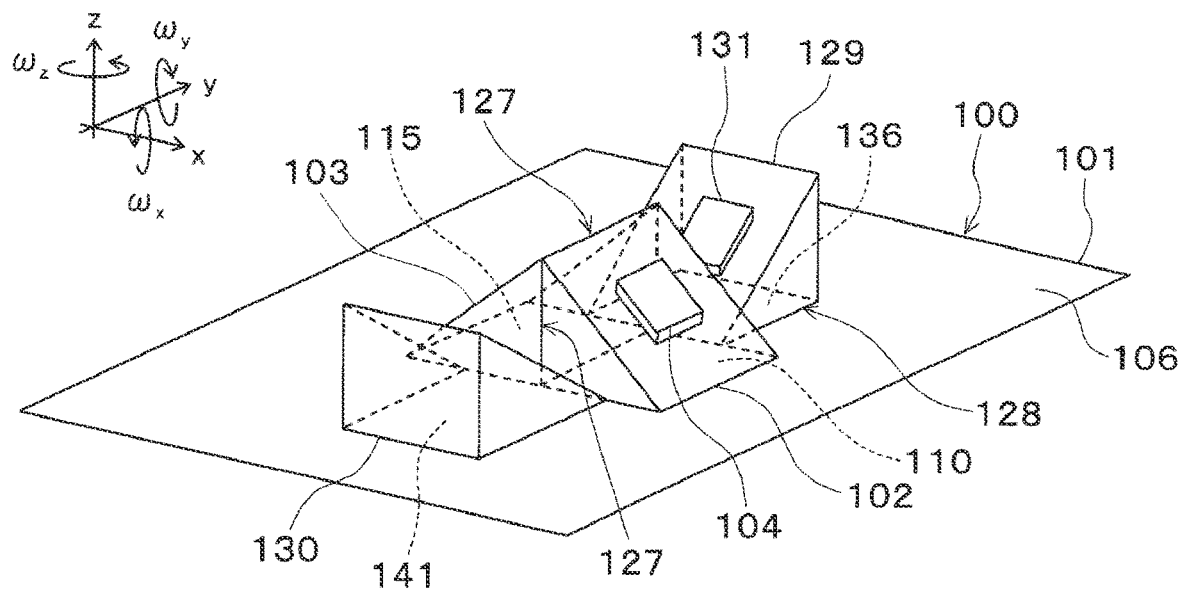
FIG. 19 is a perspective view illustrating a multi-axis inertial force sensor according to a fourth embodiment.
Figure 20:
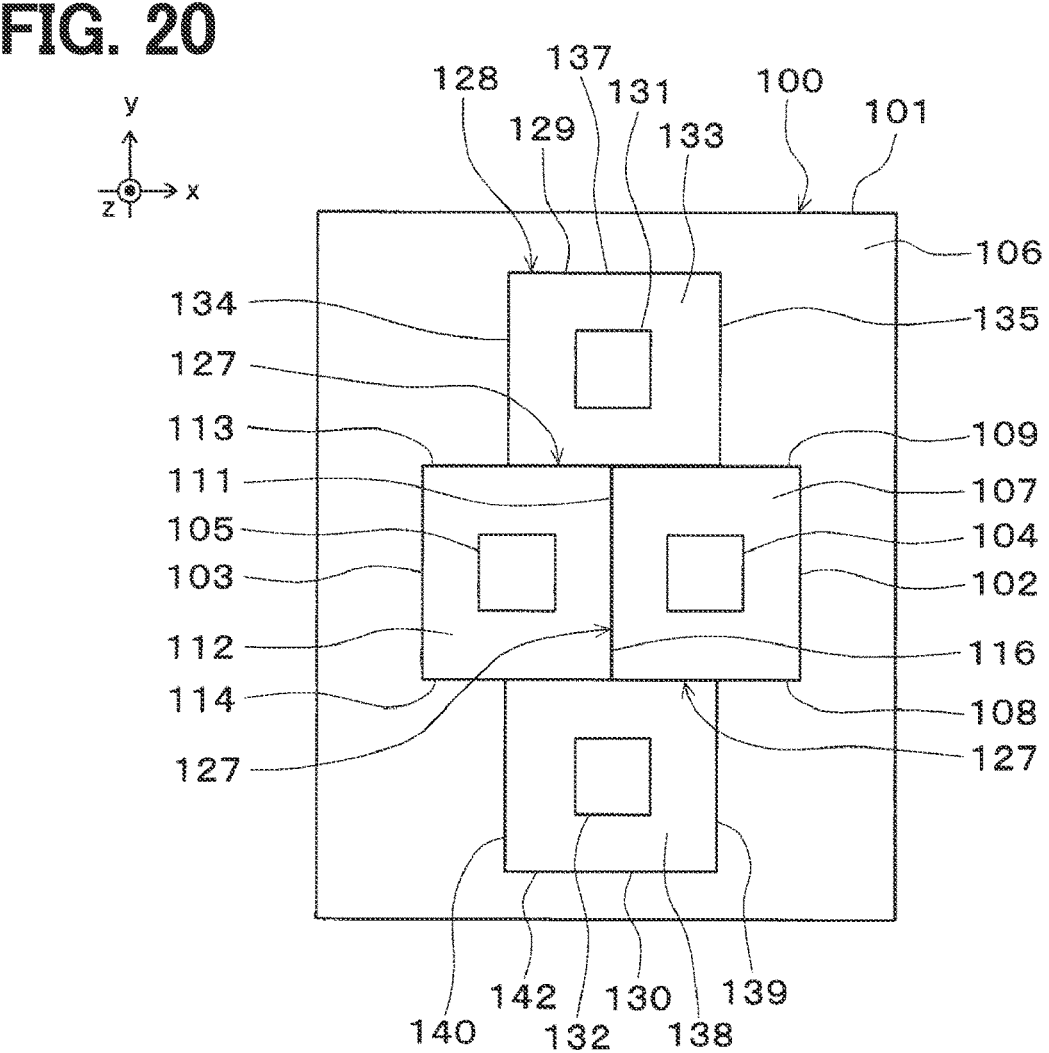
FIG. 20 is a top view of the multi-axis inertial force sensor shown in FIG. 19.

In the present embodiment, portions different from those of the third embodiment will be mainly described. As shown in FIGS. 19 and 20, the pedestal 128 is assembled such that the other end surface 109 of the first block 102 and the one end surface 113 of the second block 103 face the inclined surface 133 of the third block 129. The positioning portion 127 is formed by a tip of the corner formed by the inclined surface 133 and the one side surface 136 of the third block 129, a part of the other end surface 109 of the first block 102, and a part of the one end surface 113 of the second block 103.

The pedestal 128 is assembled so that the one end surface 108 of the first block 102 and the other end surface 114 of the second block 103 face the inclined surface 138 of the fourth block 130. The positioning portion 127 is formed by a tip of the corner formed by the inclined surface 138 and the one side surface 141 of the fourth block 130, a part of the one end surface 108 of the first block 102, and a part of the other end surface 114 of the second block 103.

As described above, the blocks 102, 103, 129, and 130 are assembled without gaps. The pedestal 128 is configured such that the third block 129 and the fourth block 130 are in line contact with the first block 102 and the second block 103.

Fifth Embodiment

Figure 21:
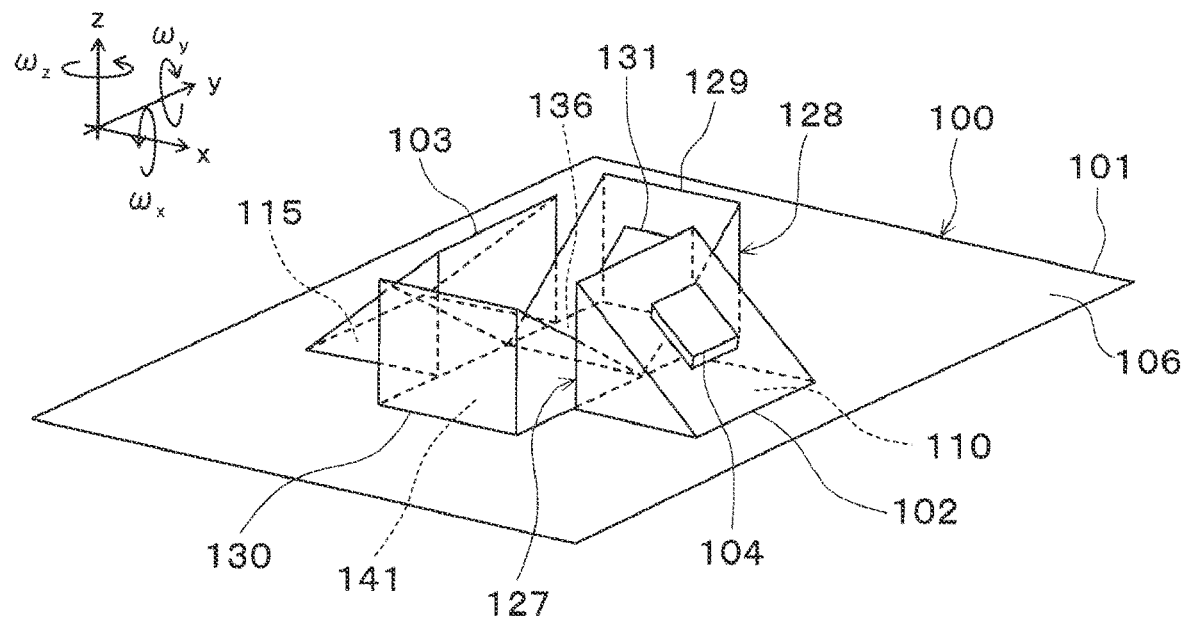
FIG. 21 is a perspective view illustrating a multi-axis inertial force sensor according to a fifth embodiment.
Figure 22:
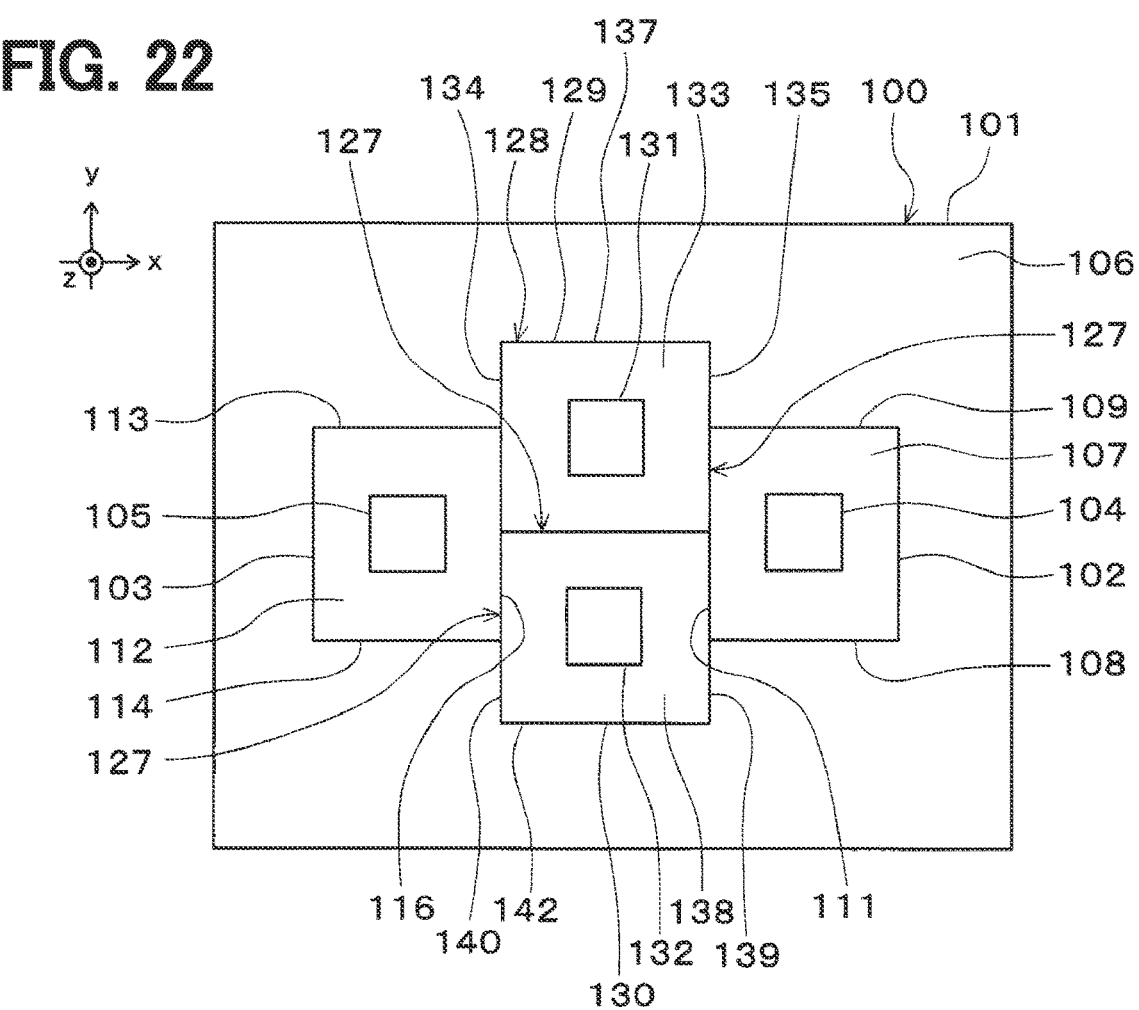
FIG. 22 is a top view of the multi-axis inertial force sensor shown in FIG. 21.

In the present embodiment, portions different from those of the third and fourth embodiments will be mainly described. As shown in FIGS. 21 and 22, the pedestal 128 is assembled so that the inclined surface 133 of the third block 129 and the inclined surface 138 of the fourth block 130 face each other. The positioning portion 127 is defined by a tip of the corner formed by the inclined surface 133 and the one side surface 136 of the third block 129 and a tip of the corner formed by the inclined surface 138 and the one side surface 141 of the fourth block 130 abutted against each other.

The pedestal 128 is assembled such that the third block 129 and the fourth block 130 are interposed between the first block 102 and the second block 103. The other side surface 111 of the first block 102 faces the other end surface 135 of the third block 129 and the one end surface 139 of the fourth block 130 without a gap. The positioning portion 127 is defined by a part of the other side surface 111 of the first block 102, a part of the other end surface 135 of the third block 129, and a part of the one end surface 139 of the fourth block 130.

The other side surface 116 of the second block 103 faces the one end surface 134 of the third block 129 and the other end surface 140 of the fourth block 130 without a gap. The positioning portion 127 is defined by a part of the other side surface 116 of the second block 103, a part of the one end surface 134 of the third block 129, and a part of the other end surface 140 of the fourth block 130.

Sixth Embodiment

Figure 23:
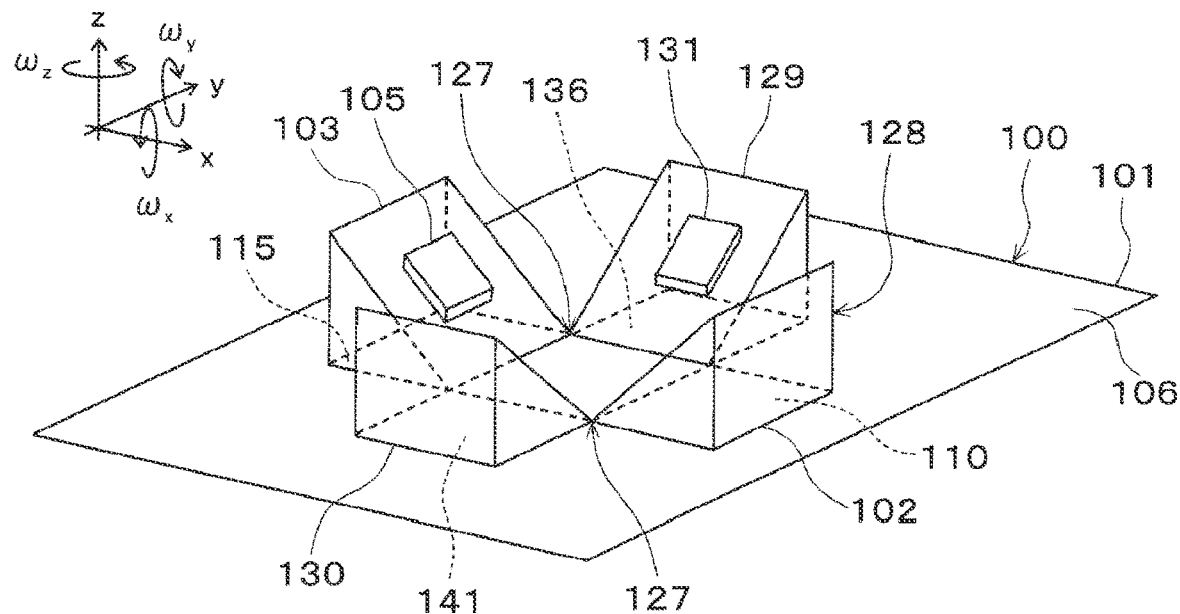
FIG. 23 is a perspective view illustrating a multi-axis inertial force sensor according to a sixth embodiment.
Figure 24:
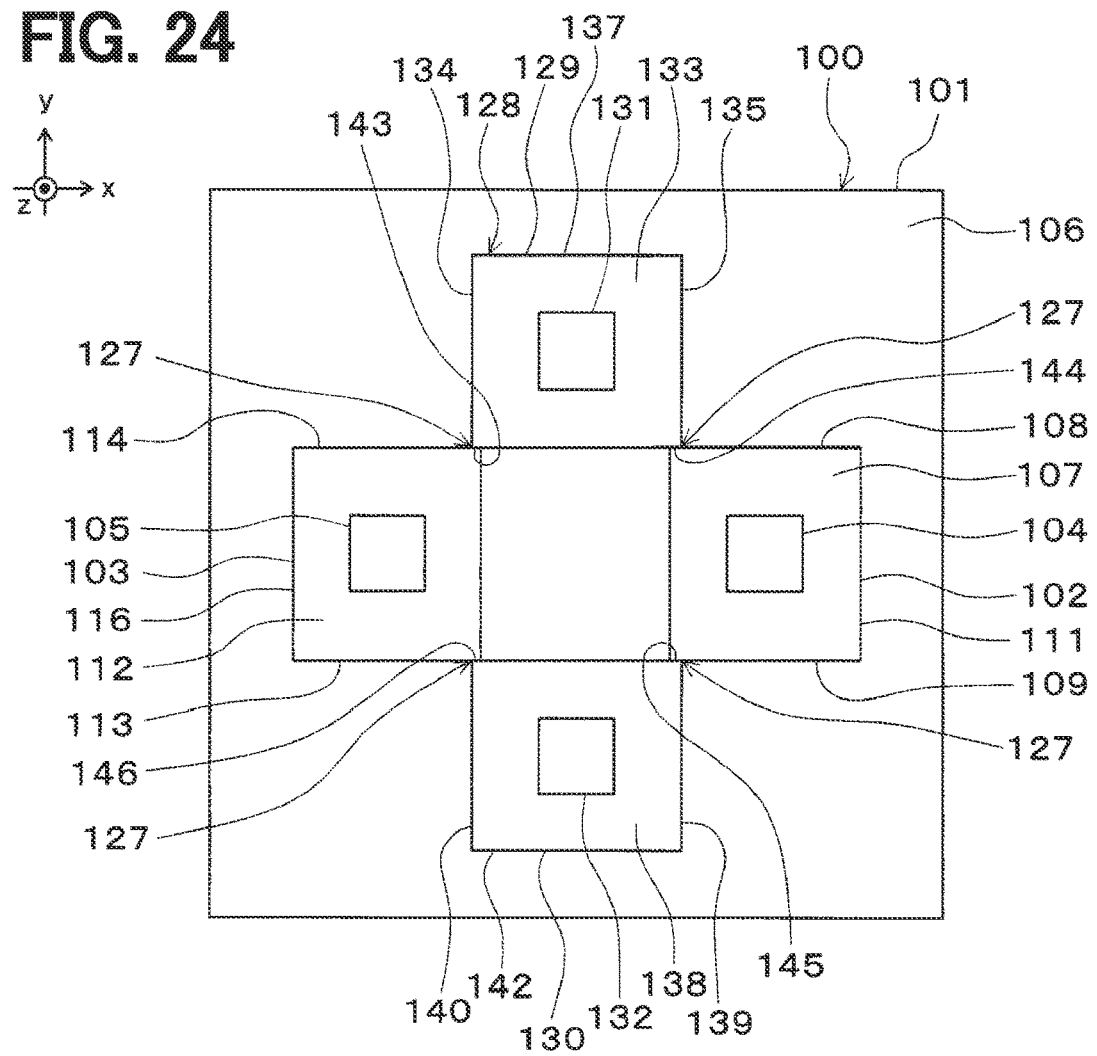
FIG. 24 is a top view of the multi-axis inertial force sensor shown in FIG. 23.

In the present embodiment, portions different from those of the third to fifth embodiments will be mainly described. As shown in FIGS. 23 and 24, the first block 102 and the second block 103 are arranged such that the inclined surface 107 of the first block 102 and the inclined surface 112 of the second block 103 face each other with a space therebetween. The third block 129 and the fourth block 130 are arranged such that the inclined surface 133 of the third block 129 and the inclined surface 138 of the fourth block 130 face each other with a space therebetween.

A corner is formed by the inclined surface 133 and the one side surface 136 of the third block 129. A tip of the corner has one end 143 adjacent to the one end surface 134, and the one end 143 abuts the other end surface 114 of the second block 103. The tip of the corner has the other end 144 adjacent to the other end surface 135, and the other end 144 abuts the one end surface 108 of the first block 102. The positioning portion 127 is defined by the one end 143 and the other end 144 of the third block 129, a part of the one end surface 108 of the first block 102, and a part of the other end surface 114 of the second block 103.

A corner is formed by the inclined surface 138 and the one side surface 141 of the fourth block 130. A tip of the corner has one end 145 adjacent to the one end surface 139, and the one end 145 abuts the other end surface 109 of the first block 102. The tip of the corner has the other end 146 adjacent to the other end surface 140, and the other end 146 abuts the one end surface 113 of the second block 103. The positioning portion 127 is defined by the one end 145 and the other end 146 of the fourth block 130, a part of the one end surface 113 of the second block 103 and a part of the other end surface 109 of the first block 102.

As described above, the pedestal 128 is assembled so as to have a space in the center. The axis orthogonality of each sensor 104, 105, 131, 132 is ensured by the positioning portion 127 in the pedestal 128.

Seventh Embodiment

Figure 25:
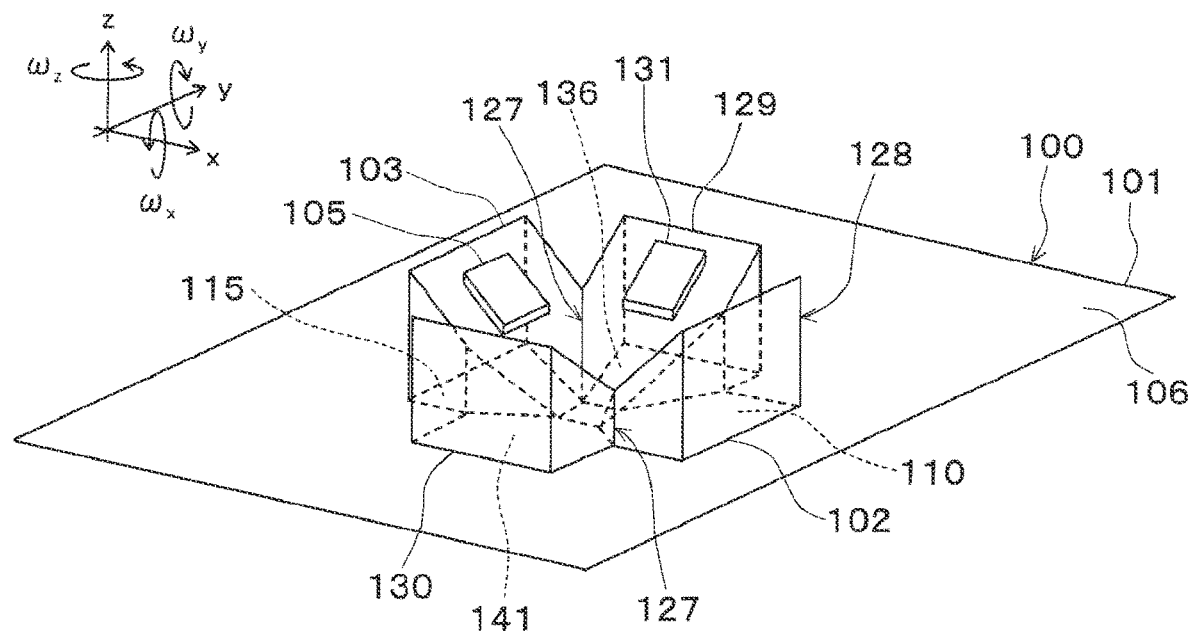
FIG. 25 is a perspective view illustrating a multi-axis inertial force sensor according to a seventh embodiment.
Figure 26:
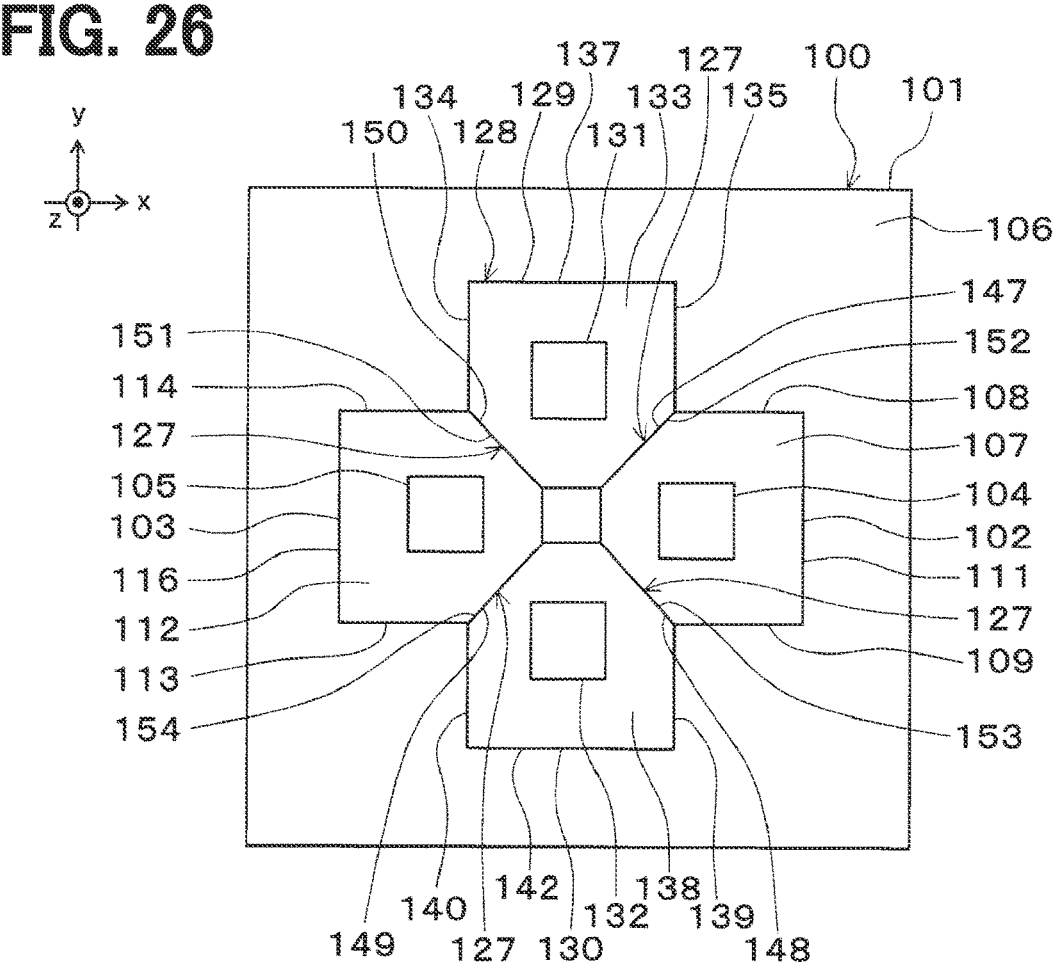
FIG. 26 is a top view of the multi-axis inertial force sensor shown in FIG. 25.

In the present embodiment, portions different from those of the sixth embodiment will be mainly described. As shown in FIGS. 25 and 26, the first block 102 has one cut surface 147 defined by cutting one end of the first block 102 formed by the inclined surface 107, the one side surface 110, and the one end surface 108 of the first block 102, along the z-axis.

The first block 102 further has the other cut surface 148 defined by cutting the other end of the first block 102 formed by the inclined surface 107, the one side surface 110, and the other end surface 109 of the first block 102, along the z-axis.

Similarly, the second block 103 has one cut surface 149 and the other cut surface 150. The third block 129 has one cut surface 151 and the other cut surface 152. The fourth block 130 has one cut surface 153 and the other cut surface 154.

The one cut surface 147 of the first block 102 and the other cut surface 152 of the third block 129 are in contact with each other. The other cut surface 148 of the first block 102 and the one cut surface 153 of the fourth block 130 are in contact with each other. Therefore, the positioning portion 127 is defined by the cut surfaces 147 and 148 of the first block 102, the other cut surface 152 of the third block 129, and the one cut surface 153 of the fourth block 130.

The one cut surface 149 of the second block 103 and the other cut surface 154 of the fourth block 130 are in contact with each other. The other cut surface 150 of the second block 103 and the one cut surface 151 of the third block 129 are in contact with each other. Therefore, the positioning portion 127 is defined by the cut surfaces 149 and 150 of the second block 103, the other cut surface 154 of the fourth block 130, and the one cut surface 151 of the third block 129.

As described above, the pedestal 128 may be assembled so that the space in the central portion is smaller than in the case of the sixth embodiment. Thereby, the pedestal 128 can be downsized.

Eighth Embodiment

Figure 27:
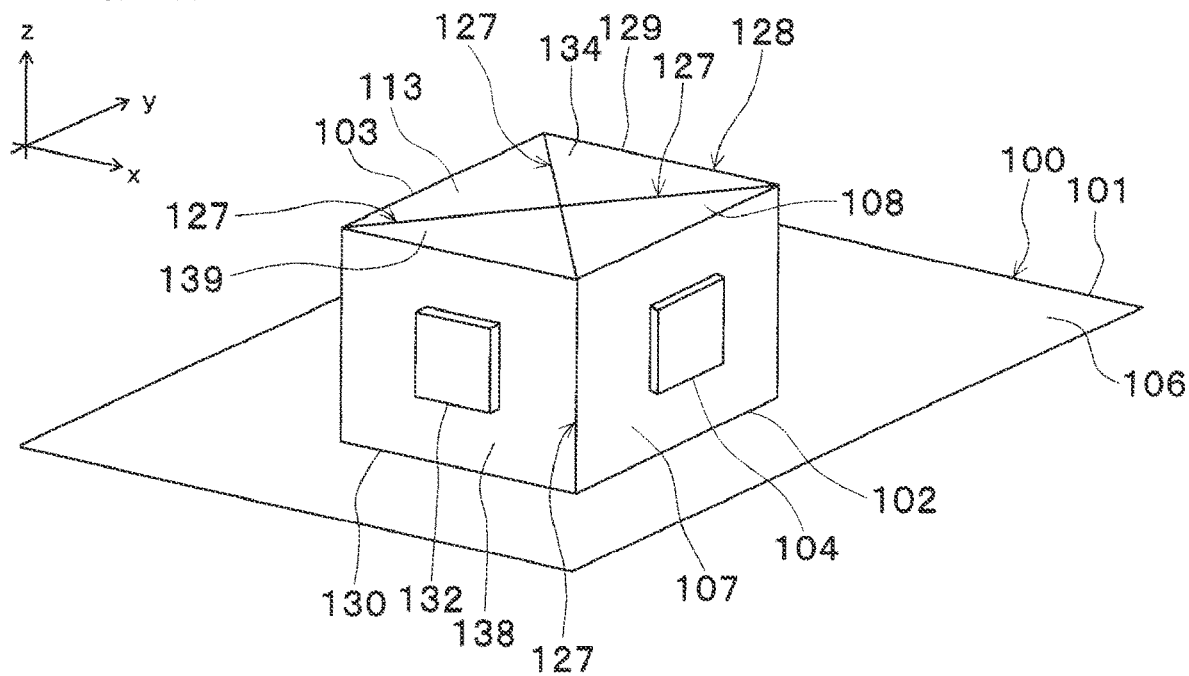
FIG. 27 is a perspective view illustrating a multi-axis inertial force sensor according to an eighth embodiment.

In the present embodiment, portions different from the above embodiments will be described. As shown in FIG. 27, the one side surface 110 of the first block 102 and the other side surface 137 of the third block 129 are in contact with each other. The other side surface 111 of the first block 102 and the one side surface 141 of the fourth block 130 are in contact with each other.

The one side surface 115 of the second block 103 and the other side surface 142 of the fourth block 130 are in contact with each other. The other side surface 116 of the second block 103 and the one side surface 136 of the third block 129 are in contact with each other.

Therefore, the positioning portion 127 is defined by the side surfaces 110 and 111 of the first block 102, the side surfaces 115 and 116 of the second block 103, the side surfaces 136 and 137 of the third block 129, and the side surfaces 141 and 142 of the fourth block 130. The accuracy of axis orthogonality of the sensor 104, 105, 131, 132 is guaranteed by the accuracy of shape of the block 102, 103, 129, 130.

The sensors 104, 105, 131, 132 are respectively mounted on the blocks 102, 103, 129, 130 so as not to cause misalignment with respect to the first other axis and the second other axis. Since the accuracy in orthogonality of each inclined surface 107, 112, 133, 138 of each block 102, 103, 129, 130 is defined by the machining accuracy, sufficient accuracy of the orthogonality can be ensured. Therefore, high axial orthogonality can be achieved.

Thus, the pedestal 128 is configured by assembling the blocks 102, 103, 129, 130 in a rectangular parallelepiped shape. The pedestal 128 is installed on the installation surface 106 of the mounting material 101 so that the one end surface 108, 113, 134, 139 of the block 102, 103, 129, 130 is located as the upper side.

Each inclined surface 107, 112, 133, 138 of each block 102, 103, 129, 130 is arranged perpendicular to the installation surface 106 of the mounting material 101. The inclination of each inclined surface 107, 112, 133, 138 includes a case where each inclined surface 107, 112, 133, 138 is perpendicular to the installation surface 106.

In this embodiment, each sensor 104, 105, 131, 132 is a two-axis acceleration sensor. The first sensor 104 and the second sensor 105 are arranged along the x-axis direction. The third sensor 131 and the fourth sensor 132 are arranged along the y-axis direction.

Acceleration in the x-axis direction is detected by the third sensor 131 and the fourth sensor 132. Acceleration in the y-axis direction is detected by the first sensor 104 and the second sensor 105. Acceleration in the z-axis direction is detected by four of the sensors 104, 105, 131, 132. Even if one of the sensors 104, 105, 131, 132 breaks down, the remaining three sensors can be used to detect three-axis accelerations.

Ninth Embodiment

Figure 28:
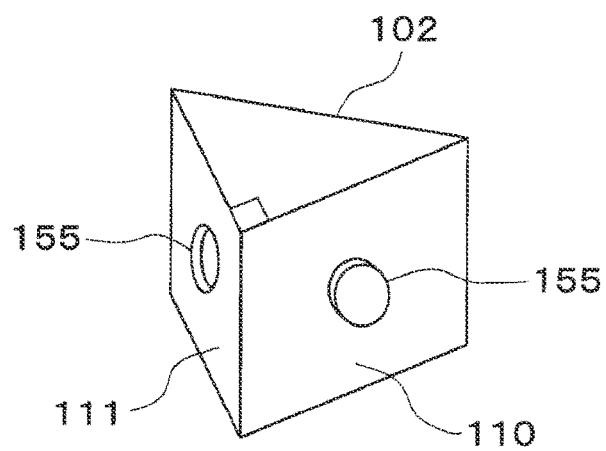
FIG. 28 is a perspective view illustrating a first block according to a ninth embodiment.
Figure 29:
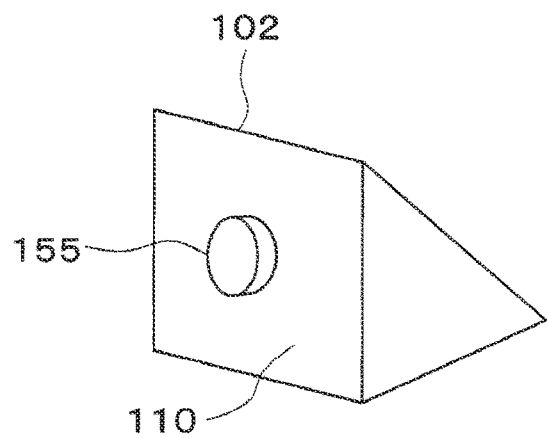
FIG. 29 is a perspective view of the first block of the ninth embodiment.
Figure 30:
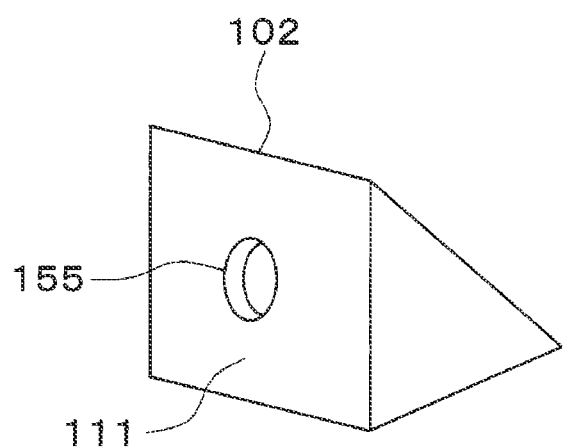
FIG. 30 is a perspective view of the first block of the ninth embodiment.

In the present embodiment, portions different from the above embodiments will be described. As shown in FIGS. 28 to 30, the first block 102 has a connecting portion 155. The connecting portion 155 is connected to a contact partner in contact with the first block 102.

The connecting portion 155 is, for example, a fitting portion. As shown in FIG. 29, the connecting portion 155 is a protrusion formed on the one side surface 110 of the first block 102. As shown in FIG. 30, the connecting portion 155 is a recess formed in the other side surface 111 of the first block 102. The other block 103, 129, 130 similarly has the connecting portion 155.

The blocks 102, 103, 129, 130 are connected with each other by inserting the protrusion of one of the blocks 102, 103, 129, 130 into the recess of the other. Further, a groove may be provided in the mounting material 101 for fixing the pedestal 128. In this case, the pedestal 128 can be mounted on the mounting material 101 without tilting.

Figure 31:
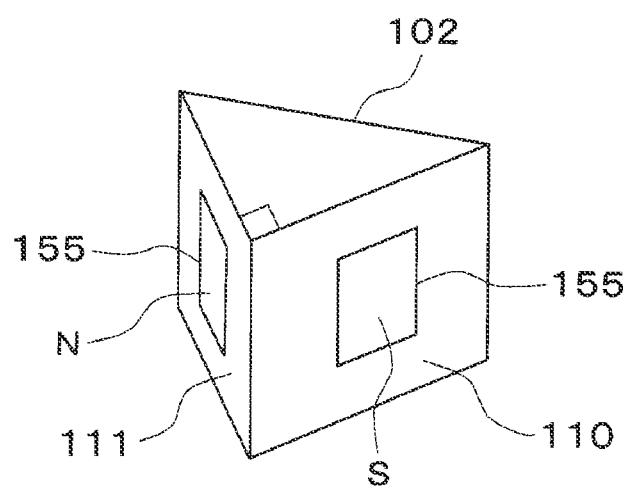
FIG. 31 is a diagram showing a modification in the first block of the ninth embodiment.
Figure 32:
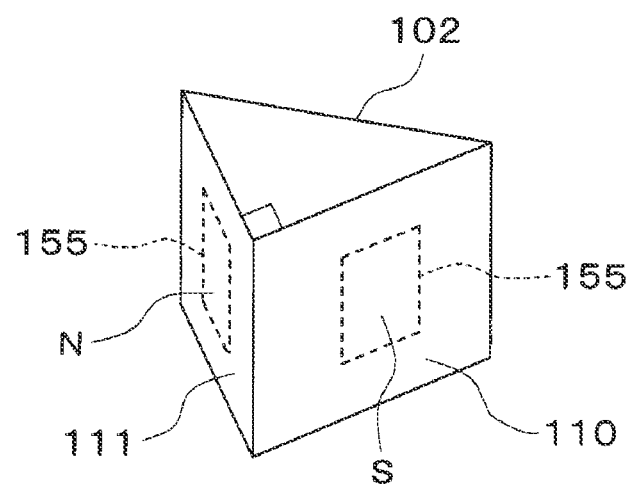
FIG. 32 is a diagram showing a modification in the first block of the ninth embodiment.

As a modification, as shown in FIG. 31, a magnet may be employed as the connecting portion 155. The magnet is embedded in a preformed groove such that the south pole is located on the one side surface 110 of the first block 102. A magnet is embedded in a preformed groove such that the north pole is located on the other side surface 111 of the first block 102. Alternatively, as shown in FIG. 32, the magnets may be insert molded into the first block 102. The other blocks 103, 129, 130 are similarly provided with magnets. The pedestal 128 is assembled by the attractive force of each magnet. The first block 102 may be hollowed out by insert molding.

Tenth Embodiment

In the present embodiment, portions different from the above embodiments will be described. In this embodiment, the multi-axis inertial force sensor 100 is applied to an IMU (Inertial Measurement Unit).

Figure 33:
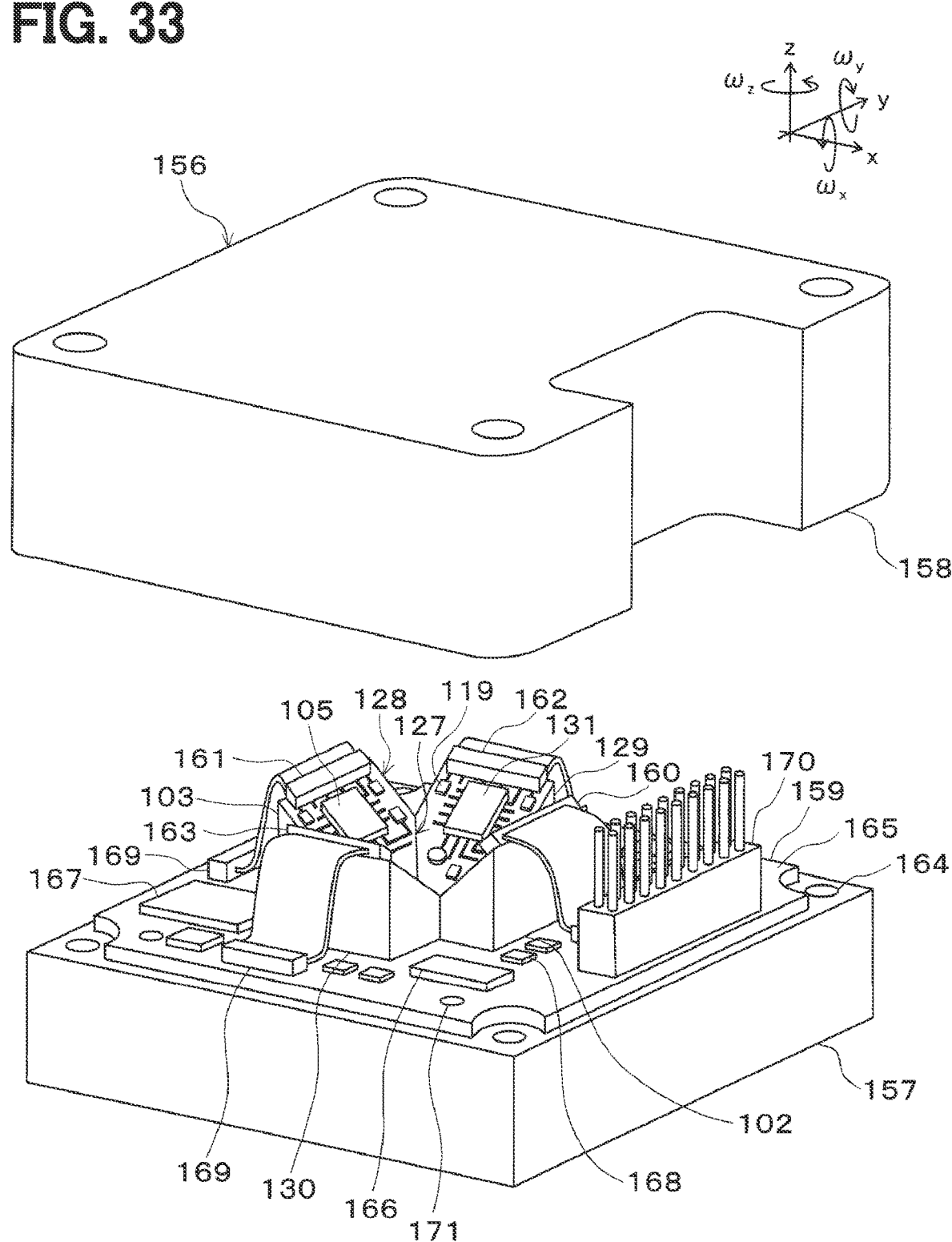
FIG. 33 is an exploded perspective view of an IMU according to a tenth embodiment.

Specifically, as shown in FIG. 33, the IMU 156 includes a sealing pedestal 157, a sealing lid 158, a printed circuit board 159 in addition to the pedestal 128 and the sensors 104, 105, 131, 132.

The pedestal 128 adopts the configuration, for example, shown in FIG. 25. Wiring and electrodes are formed on the inclined surfaces 107, 112, 133, 138 of the blocks 102, 103, 129, 130 by the MID method. The external component 119, the sensors 104, 105, 131, 132 and the sockets 160 to 163 are implemented on the inclined surfaces 107, 112, 133, 138.

Each sensor 104, 105, 131, 132 is configured as a vacuum-sealed Z-axis gyro sensor. Therefore, as described above, the four sensors 104, 105, 131, 132 sense angular velocities in the x-axis, the y-axis, and the z-axis. Each of the sockets 160 to 163 is a connection port for transmitting signals from each sensor 104, 105, 131, 132 and supplying power.

The sealing pedestal 157 and the sealing lid 158 are metal housings. The sealing pedestal 157 and the sealing lid 158 are highly rigid. The sealing lid 158 is screwed through a screw hole 164 provided in the sealing pedestal 157. Therefore, the sealing pedestal 157 and the sealing lid 158 have structures that are less susceptible to external disturbance.

The pedestal 128, an acceleration sensor 166, plural LSIs 167, plural electronic components 168, plural sockets 169, and an external socket 170 are mounted on one surface 165 of the printed circuit board 159.

The acceleration sensor 166 is, for example, a three-axis acceleration sensor. Two acceleration sensors 166 are mounted on the printed circuit board 159. Therefore, the IMU 156 is capable of highly accurately detecting six-axis inertial forces.

The LSIs 167 for calculation and the LSIs 167 in which signal correction algorithms are written are mounted on the printed circuit board 159. The electronic components 168 include ICs, circuit components, and the like.

The sockets 169 are respectively mounted to correspond to the sockets 160 to 163 of the blocks 102, 103, 129, 130. Each socket 169 is connected to each socket 160-163 by FPC (Flexible Printed Circuits). As a result, the printed circuit board 159 is electrically connected with the sensors 104, 105, 131, 132 of the blocks 102, 103, 129, 130.

The external socket 170 is an output port for transmitting the digital signal of the IMU 156 to an external device. The printed circuit board 159 is fixed to the sealing pedestal 157 by screws passing through a screw hole 171 provided in the sealing pedestal 157.

As described above, the multi-axis inertial force sensor 100 can be configured as a part of the IMU 156. Note that the acceleration sensor 166 may be mounted on each block 102, 103, 129, 130 instead of the printed circuit board 159. The printed circuit board 159 of this embodiment corresponds to a mounting material, and the one surface 165 corresponds to an installation surface.

Eleventh Embodiment

Figure 34:
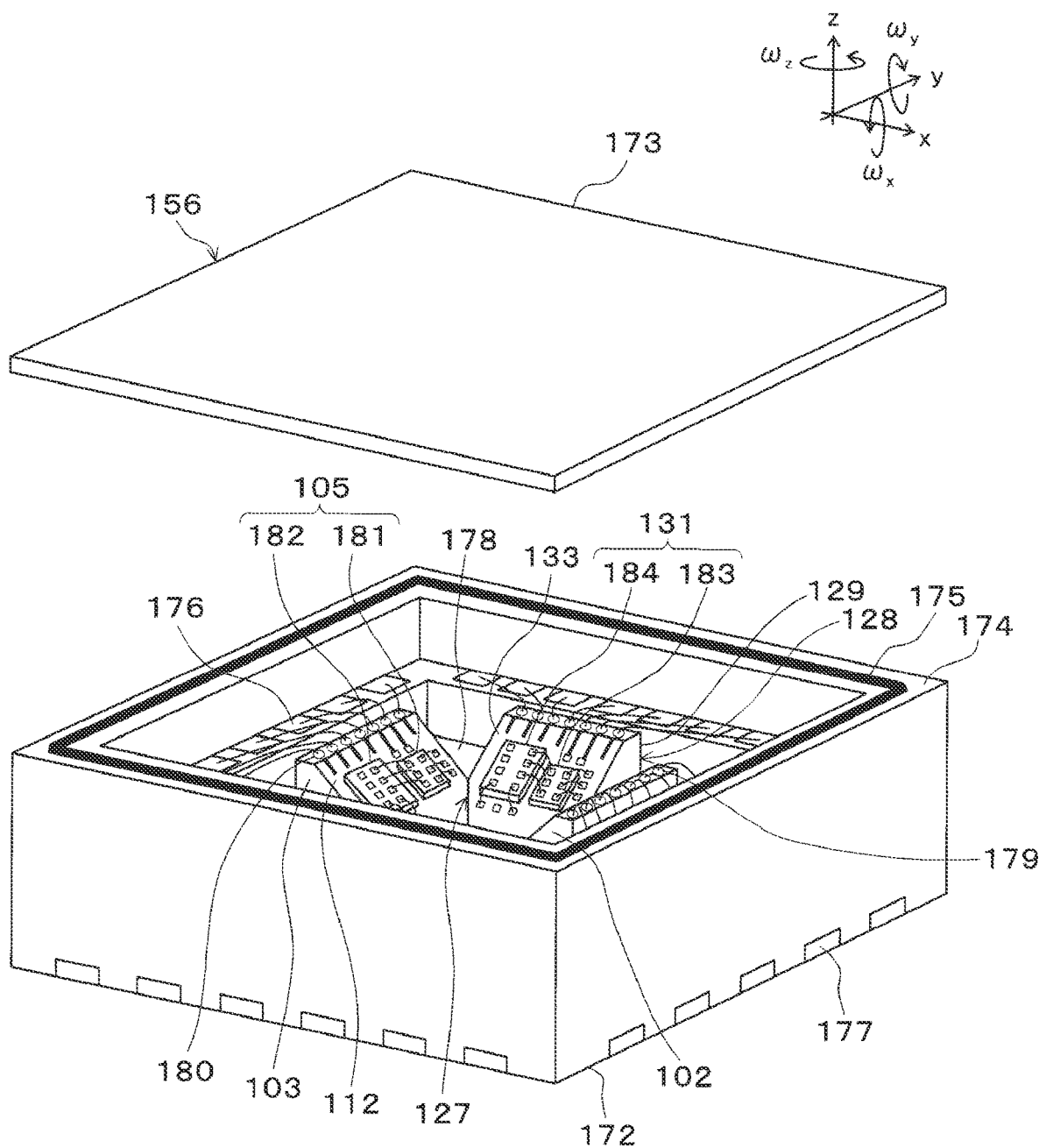
FIG. 34 is an exploded perspective view of an IMU according to an eleventh embodiment.

In the present embodiment, portions different from those of the tenth embodiment will be mainly described. As shown in FIG. 34, the IMU 156 includes a ceramic package 172 and a lid 173.

The ceramic package 172 is hermetically sealed by fixing the lid 173. The hermetic sealing is performed by melting a frame-shaped solder 175 provided at the open end 174 of the ceramic package 172. The inside of the ceramic package 172 is hermetically sealed in a vacuum. A getter film may be provided on the rear surface of the lid 173 in order to keep the inside of the ceramic package 172 vacuum. Alternatively, the ceramic package 172 may be provided with a solid getter.

The ceramic package 172 has multiple internal terminals 176 and multiple external terminals 177. The internal terminals 176 are provided inside the ceramic package 172. The external terminals 177 are provided on the wall surface of the ceramic package 172. Each external terminal 177 is for outputting a sensor signal of each sensor 104, 105, 131, 132 and for power supply of each sensor 104, 105, 131, 132. The internal terminal 176 and the external terminal 177 are electrically connected inside the ceramic package 172 by internal wiring.

The pedestal 128 is directly mounted on the bottom surface 178 of the ceramic package 172. The first block 102 has a chamfered corner formed by the inclined surface 107 and the other side surface 111, and has electrode pads 179 disposed on the chamfered corner for wire bonding. The other blocks 103, 129, 130 are similar. For example, each electrode pad 180 of the second block 103 is electrically connected to each internal terminal 176 of the ceramic package 172 by wire bonding. As a result, the second sensor 105 is supplied with power and is enabled to output a sensor signal.

The second sensor 105 is composed of a sensor element 181 and an ASIC 182. The third sensor 131 is composed of a sensor element 183 and an ASIC 184. Each sensor element 181, 183 is a Z-axis gyro sensor element. Each sensor element 181, 183 is configured as an open package. Each sensor element 181, 183 may have a WLP structure and may be hermetically sealed in vacuum at the chip level. In this case, the inside of the ceramic package 172 need only be hermetically sealed, and need not be in a vacuum. No getter film is required.

Each ASIC 182, 184 operates each sensor element 181, 183 to generate a signal. The sensor element 181, 183 and the ASIC 182, 184 are electrically connected to the electrode of the inclined surface 112, 133 by wire bonding. The configurations of the first sensor 104 and the fourth sensor 132 are also the same as described above.

The ceramic package 172 is provided with x-axis, y-axis, and z-axis acceleration sensors therein. The Z-axis acceleration sensor may be mounted on each inclined surface 107, 112, 133, 138 of the block 102, 103, 129, 130 as means for realizing a three-axis acceleration sensor. Alternatively, two three-axis acceleration sensors may be mounted on the bottom surface 178 of the ceramic package 172. Even in other configurations, it is sufficient if there is a sensor for detecting three-axis acceleration. In either form, the acceleration sensor element is hermetically sealed by the WLP under near-atmospheric pressure. Electrical wiring is performed by wire bonding, as in the case of the gyro sensor element.

With the above configuration, the IMU 156 is capable of detecting six-axis inertial force. The IMU 156 is mounted, for example, on a printed circuit board of a self-localization system via solder. The IMU 156 can block the influence of stress from the outside more not only by the blocks 102, 103, 129 130 but also by the synergistic effect of the highly rigid ceramic package 172. Therefore, the zero point is less likely to fluctuate due to stress, and the six-axis inertial force can be detected with high precision.

The ceramic package 172 of this embodiment corresponds to a mounting material, and the bottom surface 178 corresponds to an installation surface.

Twelfth Embodiment

Figure 35:
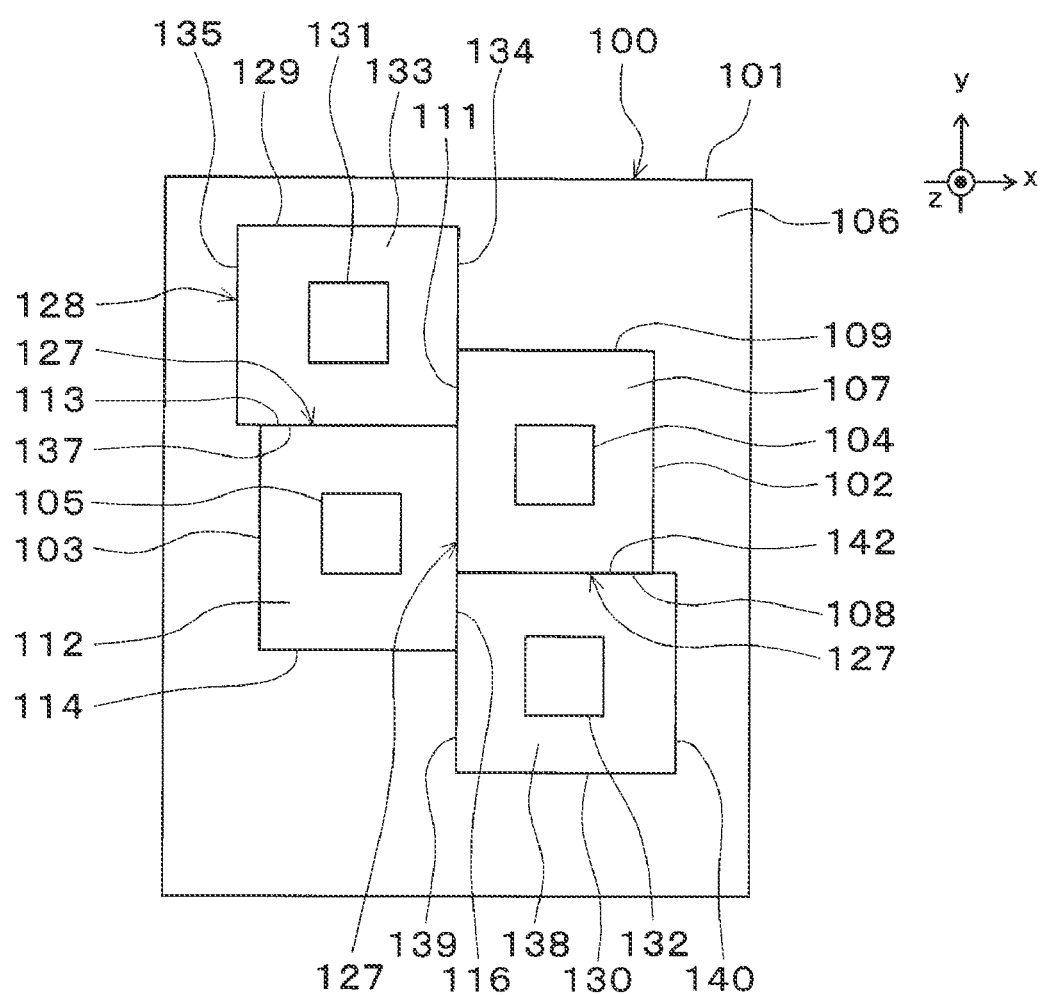
FIG. 35 is a top view of a multi-axis inertial force sensor according to a twelfth embodiment.

In the present embodiment, portions different from the above embodiments will be described. As shown in FIG. 35, the pedestal 128 is assembled in a chevron shape with the other side surface 137 and the one end surface 134 of the third block 129 as reference.

Specifically, the one end surface 113 of the second block 103 contacts the other side surface 137 of the third block 129. The one end surface 134 of the third block 129 and the other side surface 116 of the second block 103 are arranged flush on the same plane.

Therefore, a part of the one end surface 113 of the second block 103 and a part of the other side surface 137 of the third block 129 serve as the positioning portion 127.

The other side surface 111 of the first block 102 contacts both the one end surface 134 of the third block 129 and the other side surface 116 of the second block 103. A part of the other side surface 142 of the fourth block 130 contacts the one end surface 108 of the first block 102. A part of the one end surface 139 of the fourth block 130 contacts a part of the other side surface 116 of the second block 103.

Therefore, the positioning portion 127 is defined by a part of the other side surface 111 and the one end surface 108 of the first block 102 and a part of the other side surface 116 of the second block 103. Further, a part of the one end surface 134 of the third block 129 and a part of the other side surface 142 and the one end surface 139 of the fourth block 130 form the positioning portion 127.

As described above, the first block 102 and the second block 103 do not have to be arranged on a straight line. Similarly, the third block 129 and the fourth block 130 do not have to be arranged on a straight line.

As a modification, in the arrangement of the blocks 102, 103, 129, 130 shown in FIG. 35, the inclined surface 107 of the first block 102 and the inclined surface 112 of the second block 103 may be arranged to face each other. In this case, the inclined surface 133 of the third block 129 may be arranged to face the second block 103, and the inclined surface 138 of the fourth block 130 may be arranged to face the first block 102.

Thirteenth Embodiment

Figure 36:
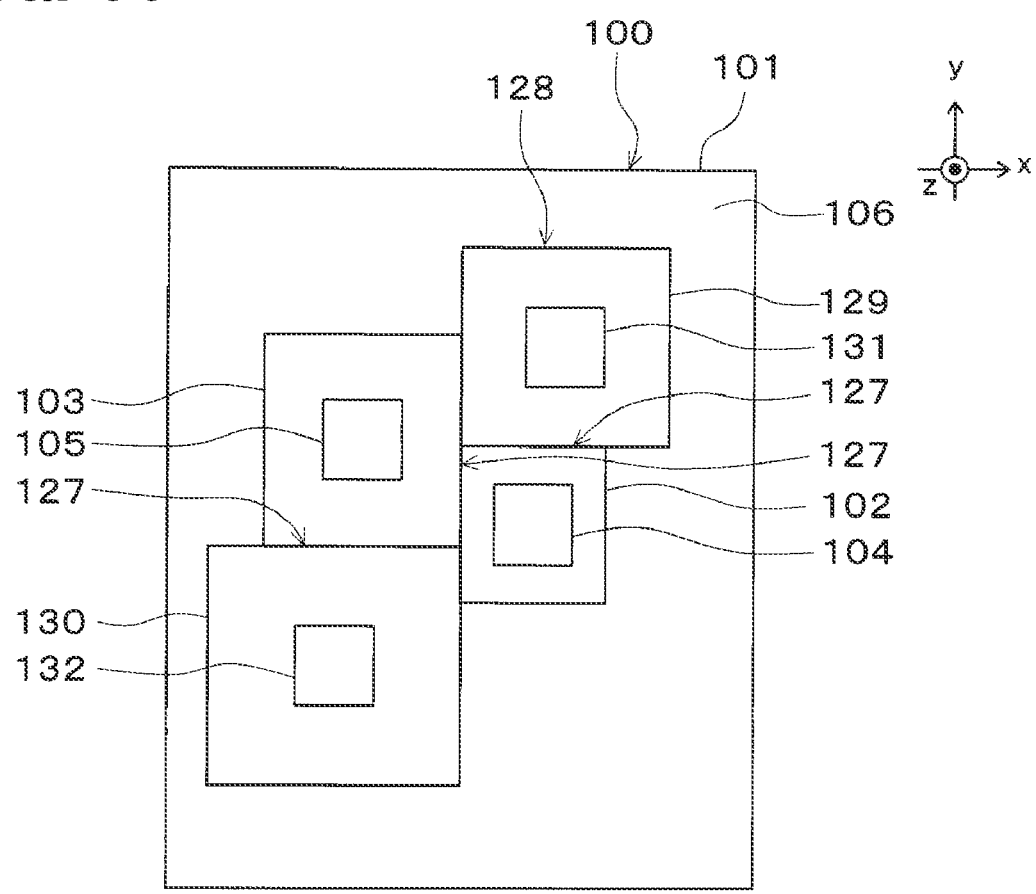
FIG. 36 is a top view of a multi-axis inertial force sensor according to a thirteenth embodiment.

In the present embodiment, portions different from the above embodiments will be described. As shown in FIG. 36, the blocks 102, 103, 129, 130 have different sizes. For example, the size increases in order of the first block 102, the second block 103, the third block 129, and the fourth block 130. The pedestal 128 is assembled, for example, with the first block 102 as a reference. The sizes of the blocks 102, 103, 129, 130 may be appropriately determined.

Fourteenth Embodiment

Figure 37:
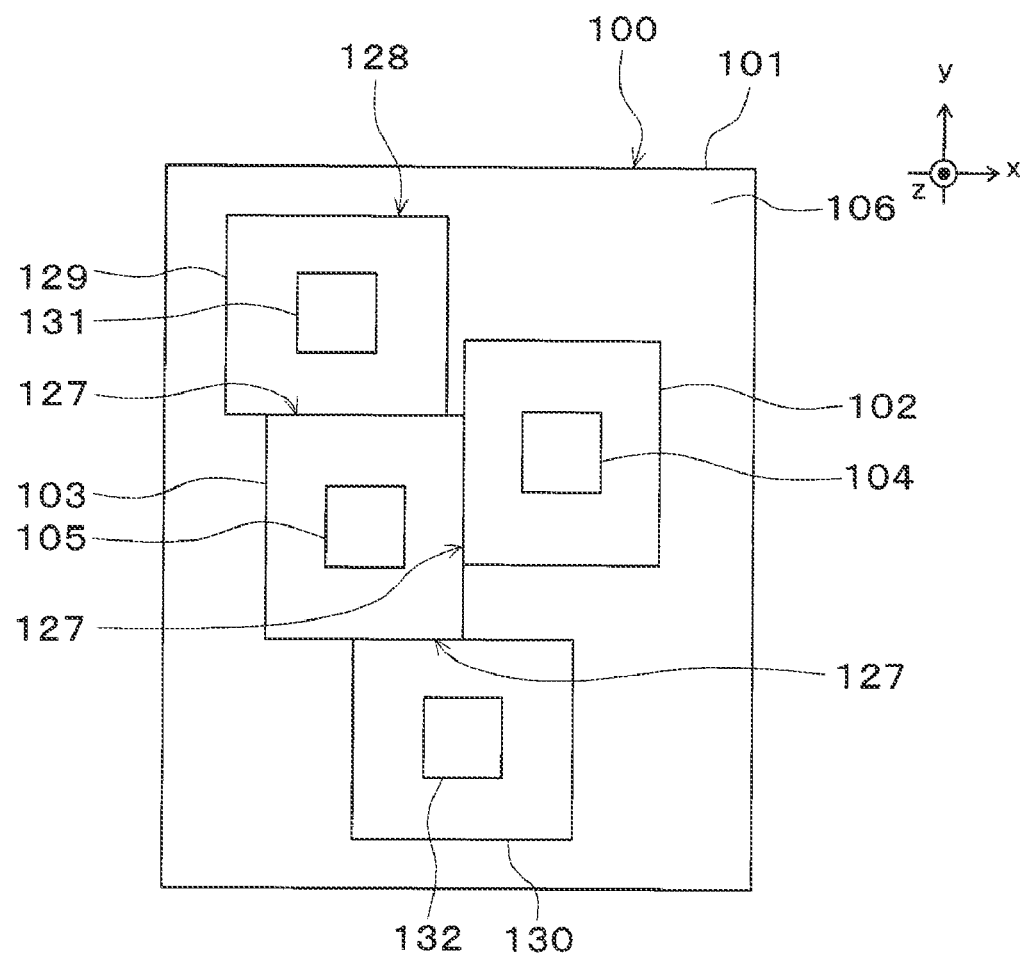
FIG. 37 is a top view of a multi-axis inertial force sensor according to a fourteenth embodiment.

In the present embodiment, portions different from the above embodiments will be described. As shown in FIG. 37, the blocks 102, 103, 129, 130 have the same size, and the pedestal 128 is assembled with the second block 103 as a reference. In this case, the first block 102, the third block 129 and the fourth block 130 do not contact each other. Note that the blocks 102, 103, 129, 130 may have different sizes.

Fifteenth Embodiment

Figure 38:
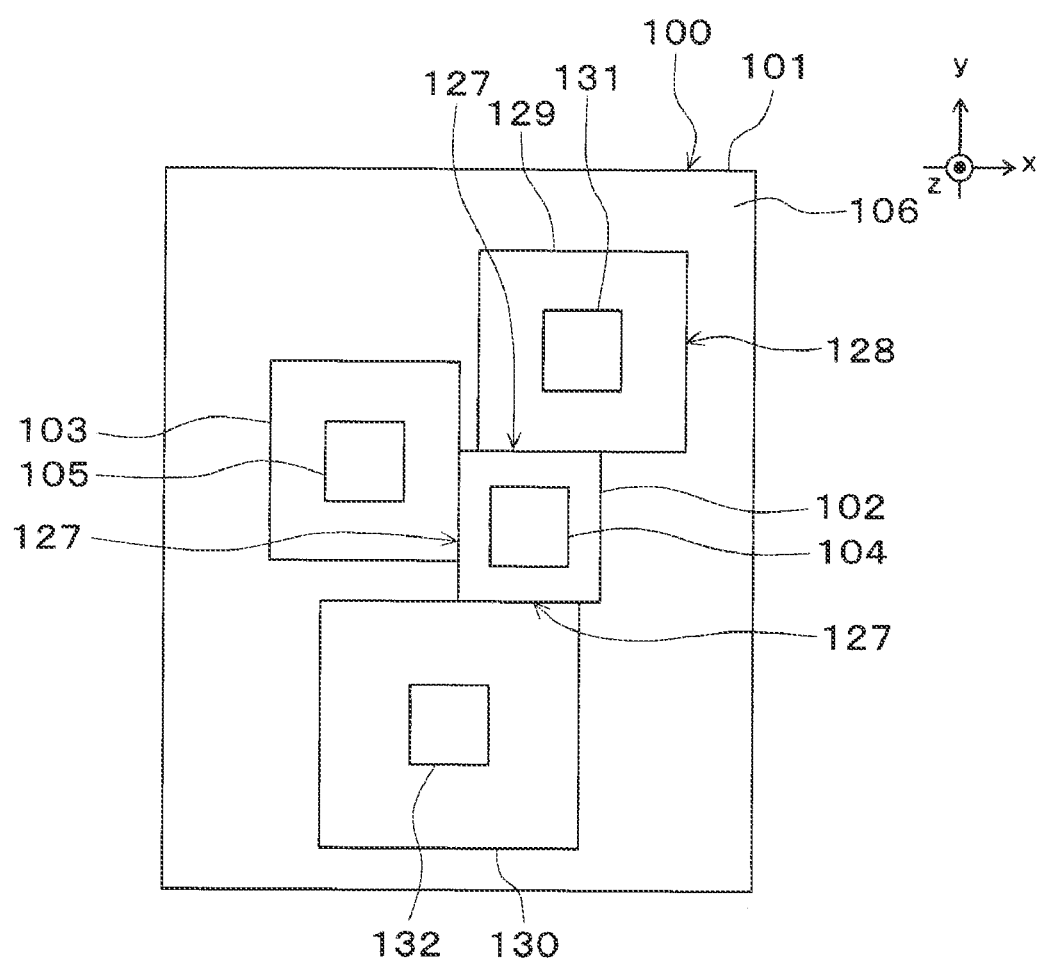
FIG. 38 is a top view of a multi-axis inertial force sensor according to a fifteenth embodiment.

In the present embodiment, portions different from the above embodiments will be described. As shown in FIG. 38, the blocks 102, 103, 129 130 have different sizes, and the pedestal 128 is assembled using the first block 102 as a reference. In this case, the second block 103, the third block 129 and the fourth block 130 do not contact each other.

The present disclosure is not limited to the embodiments described above but can be variously modified as follows without departing from the spirit of the present disclosure.

For example, each sensor 104, 105, 131, 132 may be configured as a multi-axis sensor instead of a single-axis sensor.

The number of sensors arranged on each inclined surface 107, 112, 133, 138 of each block 102, 103, 129, 130 is not limited to one. Each block 102, 103, 129, 130 may have a Z-axis acceleration sensor as well as a Z-axis gyro sensor. Thereby, it is also possible to construct a six-axis inertial force sensor.

Each of the end surfaces 108, 109 of the first block 102 may not have the shape of an isosceles right triangle. That is, the inclined surface 107 of the first block 102 does not have to be inclined at an angle of 45° with respect to the installation surface 106 of the mounting material 101.

Each inclined surface 107, 112, 133, 138 of each block 102, 103, 129, 130 may be inclined with respect to the installation surface 106. Therefore, each block 102, 103, 129, 130 may have a shape in which each inclined surface 107, 112, 133, 138 is not only inclined at an acute angle and perpendicularly to the installation surface 106, but also at an obtuse angle. In other words, each of the blocks 102, 103, 129, 130 may be formed in a trapezoidal shape or an arbitrary shape instead of a triangular prism.

The pedestal 128 may be assembled so that one end surface and the other end surface of the blocks 102, 103, 129 130 face each other. Alternatively, the pedestal 128 may be assembled so that one inclined surface and the other side surface of the blocks 102, 103, 129, 130 face each other.

The number of blocks forming the pedestal 128 is not limited to two or four, and may be larger than two. The pedestal 128 may be assembled not only with an even number of blocks, but also with an odd number of blocks.

The pedestal 128 may include blocks with inclined surfaces oriented in the same direction.

Although the present disclosure has been described in accordance with the examples, it is understood that the present disclosure is not limited to the above examples or structures. The present disclosure encompasses various modifications and variations within the scope of equivalents. In addition, as the various combinations and configurations, which are preferred, other combinations and configurations, including more, less or only a single element, are also within the spirit and scope of the present disclosure.

What is claimed is:

1. A multi-axis inertial force sensor comprising:
   a mounting material having an installation surface;
   a plurality of blocks arranged on the installation surface of the mounting material and respectively having inclined surfaces inclined with respect to the installation surface; and
   a plurality of sensors respectively arranged on the inclined surfaces of the plurality of blocks to detect an inertial force corresponding to main axes,
   wherein
   the plurality of blocks has a positioning portion that relatively determines a position of a contact partner in contact with at least one or more of the plurality of blocks, and forms a pedestal by an assembly of the plurality of blocks where positions are determined relative to each other based on the positioning portion and where the inclined surfaces are oriented in different directions,
   the plurality of sensors is respectively arranged on the inclined surfaces of the pedestal so that the main axes are oriented in different directions to detect vector components of the inertial force corresponding to the main axes,
   the plurality of blocks includes a first block, a second block, a third block, and a fourth block, each of which is a triangular prism having one end surface and an other end surface shaped in a right triangle and connected to the inclined surface, and one side surface and an other side surface connected to the inclined surface and the end surfaces,
   the inclined surface corresponds to an oblique side of the right triangle,
   the one side surface of the first block, the one side surface of the second block, the one side surface of the third block, and the one side surface of the fourth block are arranged on the installation surface,
   the other side surface of the first block and the other side surface of the second block face each other and are in contact with each other without a gap,
   the first block, the second block and the third block are arranged without a gap by contacting each other such that the one end surface of the second block and the other end surface of the first block face the inclined surface of the third block, and
   the first block, the second block and the fourth block are arranged without a gap by contacting each other such that the one end surface of the first block and the other end surface of the second block face the inclined surface of the fourth block.

2. The multi-axis inertial force sensor according to claim 1, wherein the pedestal is configured by arranging the plurality of blocks point-symmetrically with respect to a reference point on the installation surface of the mounting material.

3. The multi-axis inertial force sensor according to claim 1, wherein
   the plurality of sensors is a single axis gyro sensor in which the main axis is parallel to a Z-axis direction perpendicular to the inclined surface so as to detect an angular velocity around the Z-axis direction as the inertial force.

4. The multi-axis inertial force sensor according to claim 1, wherein
   the plurality of sensors is a single axis acceleration sensor in which the main axis is parallel to a Z-axis direction perpendicular to the inclined surface so as to detect an acceleration in the Z-axis direction as the inertial force.

5. The multi-axis inertial force sensor according to claim 1, wherein
   the plurality of blocks has a triangular end surface connected to the inclined surface and a side surface connected to the inclined surface and the triangular end surface, and
   the pedestal is assembled such that the inclined surface of one of the plurality of blocks faces the inclined surface of the other block, the end surface of one of the plurality of blocks faces the end surface of the other block, the side surface of one of the plurality of blocks faces the side surface of the other block, the inclined surface of one of the plurality of blocks faces the end surface of the other block, the inclined surface of one of the plurality of blocks faces the side surface of the other block, or the end surface of one of the plurality of blocks faces the side surface of the other block.

6. The multi-axis inertial force sensor according to claim 5, wherein the plurality of blocks is assembled with no space therebetween.

7. The multi-axis inertial force sensor according to claim 1, wherein
the plurality of blocks has a triangular end surface connected to the inclined surface and a side surface connected to the inclined surface and the end surface, and
the pedestal is formed in a chevron shape by an assembly of the plurality of blocks such that the end surface of one of the plurality of blocks faces the side surface of the other block, or the side surface of one of the plurality of blocks faces the side surface of the other block.

8. The multi-axis inertial force sensor according to claim 1, wherein
the plurality of blocks has a triangular end surface connected to the inclined surface and a side surface connected to the inclined surface and the end surface, and
the pedestal has a rectangular parallelepiped shape in which the side surface of one of the plurality of blocks and the side surface of the other block are in contact with each other.

9. The multi-axis inertial force sensor according to claim 5, wherein the end surface of the plurality of blocks has a shape of an isosceles right triangle.

10. The multi-axis inertial force sensor according to claim 9, wherein the inclined surface corresponds to an oblique side of the isosceles right triangle.

11. The multi-axis inertial force sensor according to claim 1, wherein all of the plurality of blocks have the same shape.

12. The multi-axis inertial force sensor according to claim 1, wherein the plurality of blocks has a connecting portion to be connected to the contact partner in contact with at least one or more of the plurality of blocks.

13. The multi-axis inertial force sensor according to claim 1, wherein the plurality of blocks has an electronic component provided on the inclined surface.

14. A multi-axis inertial force sensor comprising:
a mounting material having an installation surface;
a plurality of blocks arranged on the installation surface of the mounting material and respectively having inclined surfaces inclined with respect to the installation surface; and
a plurality of sensors respectively arranged on the inclined surfaces of the plurality of blocks to detect an inertial force corresponding to main axes,
wherein
the plurality of blocks has a positioning portion that relatively determines a position of a contact partner in contact with at least one or more of the plurality of blocks, and forms a pedestal by an assembly of the plurality of blocks where positions are determined relative to each other based on the positioning portion and where the inclined surfaces are oriented in different directions,
the plurality of sensors is respectively arranged on the inclined surfaces of the pedestal so that the main axes are oriented in different directions to detect vector components of the inertial force corresponding to the main axes,
the plurality of blocks includes a first block, a second block, a third block, and a fourth block, each of which is a triangular prism having one end surface and an other end surface shaped in a right triangle and connected to the inclined surface, and one side surface and an other side surface connected to the inclined surface and the end surfaces,
the inclined surface corresponds to an oblique side of the right triangle,
the one side surface of the first block, the one side surface of the second block, the one side surface of the third block, and the one side surface of the fourth block are arranged on the installation surface,
the inclined surface of the third block and the inclined surface of the fourth block face each other, and the third block and the fourth block are arranged without a gap, a tip of a corner formed by the inclined surface of the third block and the one side surface of the third block being in contact with a tip of a corer formed by the inclined surface of the fourth block and the one side surface of the fourth block,
the one end surface of the fourth block and the other end surface of the third block face the other side surface of the first block without a gap, and
the other side surface of the second block faces the one end surface of the third block and the other end surface of the fourth block without a gap.

15. A multi-axis inertial force sensor comprising:
a mounting material having an installation surface;
a plurality of blocks arranged on the installation surface of the mounting material and respectively having inclined surfaces inclined with respect to the installation surface; and
a plurality of sensors respectively arranged on the inclined surfaces of the plurality of blocks to detect an inertial force corresponding to main axes,
wherein
the plurality of blocks has a positioning portion that relatively determines a position of a contact partner in contact with at least one or more of the plurality of blocks, and forms a pedestal by an assembly of the plurality of blocks where positions are determined relative to each other based on the positioning portion and where the inclined surfaces are oriented in different directions, and
the plurality of sensors is respectively arranged on the inclined surfaces of the pedestal so that the main axes are oriented in different directions to detect vector components of the inertial force corresponding to the main axes,
the plurality of blocks includes a first block, a second block, a third block, and a fourth block, each of which is a triangular prism having one end surface and an other end surface shaped in a right triangle and connected to the inclined surface, and one side surface and an other side surface connected to the inclined surface and the end surfaces,
the inclined surface corresponds to an oblique side of the right triangle,
the one side surface of the first block, the one side surface of the second block, the one side surface of the third block, and the one side surface of the fourth block are arranged on the installation surface,
the inclined surface of the first block and the inclined surface of the second block face each other, and the first block and the second block are arranged with a space therebetween,
the inclined surface of the third block and the inclined surface of the fourth block face each other, and the third block and the fourth block are arranged with a space therebetween,
one end of a tip of a corner formed by the inclined surface of the third block and the one side surface of the third block adjacent to the one end surface of the third block is abutted against the other end surface of the second block, an other end of the tip of the corner formed by the inclined surface of the third block and the one side surface of the third block adjacent to the other end surface of the third block is abutted against the one end surface of the first block, one end of a tip of a corner formed by the inclined surface of the fourth block and the one side surface of the fourth block adjacent to the one end surface of the fourth block is abutted against the other end surface of the first block, and an other end of the tip of the corner formed by the inclined surface of the fourth block and the one side surface of the fourth block adjacent to the other end surface of the fourth block is abutted against the one end face of the second block.

16. A multi-axis inertial force sensor comprising:

a mounting material having an installation surface;

a plurality of blocks arranged on the installation surface of the mounting material and respectively having inclined surfaces inclined with respect to the installation surface; and a plurality of sensors respectively arranged on the inclined surfaces of the plurality of blocks to detect an inertial force corresponding to main axes, wherein the plurality of blocks has a positioning portion that relatively determines a position of a contact partner in contact with at least one or more of the plurality of blocks, and forms a pedestal by an assembly of the plurality of blocks where positions are determined relative to each other based on the positioning portion and where the inclined surfaces are oriented in different directions, and the plurality of sensors is respectively arranged on the inclined surfaces of the pedestal so that the main axes are oriented in different directions to detect vector components of the inertial force corresponding to the main axes, the plurality of blocks includes a first block, a second block, a third block, and a fourth block, each of which is a triangular prism having one end surface and an other end surface shaped in a right triangle and connected to the inclined surface, and one side surface and an other side surface connected to the inclined surface and the end surfaces, the inclined surface corresponds to an oblique side of the right triangle, the one side surface of the first block, the one side surface of the second block, the one side surface of the third block, and the one side surface of the fourth block are arranged on the installation surface, an axis perpendicular to the installation surface is defined as a z-axis, the first block has one cut surface defined by cutting one end of the first block formed by the inclined surface, the one side surface, and the one end surface of the first block along the z-axis, and an other cut surface defined by cutting an other end of the first block formed by the inclined surface, the one side surface, and the other end surface of the first block along the z-axis, the second block has one cut surface defined by cutting one end of the second block formed by the inclined surface, the one side surface, and the one end surface of the second block along the z-axis, and an other cut surface defined by cutting an other end of the second block formed by the inclined surface, the one side surface, and the other end surface of the second block along the z-axis, the third block has one cut surface defined by cutting one end of the third block formed by the inclined surface, the one side surface, and the one end surface of the third block along the z-axis, and an other cut surface defined by cutting an other end of the third block formed by the inclined surface, the one side surface, and the other end surface of the third block along the z-axis, the fourth block has one cut surface defined by cutting one end of the fourth block formed by the inclined surface, the one side surface, and the one end surface of the fourth block along the z-axis, and an other cut surface defined by cutting an other end of the fourth block formed by the inclined surface, the one side surface, and the other end surface of the fourth block along the z-axis, the inclined surface of the first block and the inclined surface of the second block face each other, and the first block and the second block are arranged with a space therebetween, the inclined surface of the third block and the inclined surface of the fourth block face each other, and the third block and the fourth block are arranged with a space therebetween, the one cut surface of the first block and the other cut surface of the third block are in contact, and the other cut surface of the first block and the one cut surface of the fourth block are in contact, and the one cut surface of the second block and the other cut surface of the fourth block are in contact, and the other cut surface of the second block and the one cut surface of the third block are in contact.

* * * * *